(12) United States Patent
Ohwada

(10) Patent No.: US 6,711,641 B2
(45) Date of Patent: Mar. 23, 2004

(54) OPERATION PROCESSING APPARATUS

(75) Inventor: Akihiko Ohwada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 394 days.

(21) Appl. No.: 09/729,824

(22) Filed: Dec. 6, 2000

(65) Prior Publication Data

US 2001/0049762 A1 Dec. 6, 2001

(30) Foreign Application Priority Data

Jun. 1, 2000 (JP) ........................................ 2000-165096

(51) Int. Cl.[7] .............................................. G06F 13/24
(52) U.S. Cl. ........................ 710/260; 710/264; 712/242
(58) Field of Search ................. 710/260–269; 712/242, 11

(56) References Cited

U.S. PATENT DOCUMENTS 4,736,291 A * 4/1988 Jennings et al. ............. 712/11
6,263,396 B1 * 7/2001 Cottle et al. ................. 710/263

FOREIGN PATENT DOCUMENTS

| JP | SHO 64-23343 A | 1/1989 |
| JP | HEI 2-110650 A | 4/1990 |
| JP | SHO 63-142434 A | 6/1998 |

* cited by examiner

Primary Examiner—Khanh Dang
(74) Attorney, Agent, or Firm—Staas & Halsey LLP

(57) ABSTRACT

The operation processing apparatus comprises a trap selecting register which stores trap maps for selecting one operating system in which the operation processing apparatus is applied out of a plurality of operating systems, a read/write controller which selects data for selecting the operating system from the trap selecting register, and a trap type encoder which encodes a trap request from an execution unit such as an integer unit, into trap type code, according to the trap maps corresponding to the selection data.

16 Claims, 20 Drawing Sheets

OPERATION PROCESSING APPARATUS

FIELD OF THE INVENTION

The present invention in general relates to an operation processing apparatus having a trap (interrupt) map for defining the corresponding relation of trap request and trap type code. More particularly, this invention relates to an operation processing apparatus capable of selecting one suited to the operating system to be used, from a plurality of trap maps.

BACKGROUND OF THE INVENTION

Hitherto, in a computer system, an operation processing apparatus designed according to the operating system to be used has been employed. This operation processing apparatus has a trap map for converting various trap requests occurring during process into codes called trap type code. When designing the operation processing apparatus, therefore, the trap map is designed to as to be suited to the operating system to be used.

However, in the conventional operation processing apparatus, when changing one operating system to a different operating system, the trap map must be newly designed, which is accompanied by many demerits from the viewpoint of designing time and cost. Therefore, the means and methods for solving such problems effectively have been keenly demanded so far.

FIG. 19 is a block diagram showing a configuration of a conventional operation processing apparatus. In this specification, the term "trap" is interpreted in a wide sense of meaning, including I-trap (Instruction Trap) detected when issuing an instruction, E-trap (Execution Trap) detected when executing an illegal instruction, trap detected at the time of asynchronous error or watchdog time-out, exception occurring in the program due to arithmetic overflow or the like, and interrupt due to external factor of I/O (Input/Output) or the like. Hence the "trap request" means request for processing (interrupt, etc.) corresponding to such "trap".

The integer unit 10 is an operator for executing integer operation according to an integer operation command, and it issues a trap request 11 as required. The floating point unit 20 is an operator for executing a floating point operation according to a floating point operation command, and it issues a trap request 21 as required. The memory management unit 30 converts mutually between virtual address and physical address, and controls access to a cache memory (not shown), and it also issues a trap request 31 as required. The program counter/branch unit 40 counts execution programs, and predicts a branch address of branch instruction of program, and it also issues a trap request 41 as required.

The CPU local bus I/F controller 50 controls the flow of data on a local bus (not shown), and it issues a trap request 51 as required. The trap controller 60 has a function of ranking the priority of the trap requests 11, 21, 31, 41, and 51, a function of converting a trap request 71 into trap type code 91, and a function of reading and/or writing the trap type code 91. The trap type code 91 is the data for identifying the cause of a trap. The trap controller 60 is composed of a priority controller 70, a trap type encoder 80, a read/write controller 100, and a trap type register 110.

If a plurality of requests are input at the same time, the priority controller 70 selects, out of the trap requests 11, 21, 31, 41, and 51, the one with the highest priority and issues as trap request 71 according to the predetermined priority. The priority is determined in the sequence of trap request 11>trap request 21>trap request 31>trap request 41>trap request 51. In this case, when trap request 11 and trap request 21 are given at the same time, the priority controller 70 issues the trap request 11 of higher priority as the trap request 71.

The trap type encoder 80 encodes the trap request 71 from the priority controller 70 into the trap type code 91 that can be processed in the operation processing apparatus according to the trap map 90. This trap map 90 conforms to a certain type of operating system. Therefore, if the trap map 90 is used in a different type of operating system, there is a possibility of malfunction.

The trap map 90 shown in FIG. 20 defines the corresponding relation between plural trap requests and trap type code corresponding to them one by one. In the diagram, as the trap requests 71 (see FIG. 19), trap request $71_0$ (power#on#reset: the underbar is shown in the diagram, but "#" is used instead in the specification) to trap request $71_5$ (data#access#MMU#error) are shown, and as the trap type code 91 (see FIG. 19), trap type code $91_0$ (0×001) to trap type code $91_5$ (0×031) are shown. For example, when trap request $71_0$ is given as the trap request 71 (see FIG. 19), the trap type encoder 80 issues trap type code $91_0$ (0×001) corresponding to the trap request $71_0$, as the trap type code 91 (see FIG. 19) according to the trap map 90.

Referring again to FIG. 19, the read/write controller 100 writes the trap type code 91 from the trap type encoder 80 into the trap type register 110, and reads the trap type code 91 from the trap type register 110, and transfers it to a memory (not shown).

When the trap request 11 is issued only from the integer unit 10, the priority controller 70 sends the trap request 11 to the trap type encoder 80 as trap request 71. In this case, the trap request 71 is supposed to be trap request $71_0$ shown in FIG. 20. Hence, the trap type encoder 80 refers to the trap map 90, and encodes the tarp request $71_0$ into trap type code $91_0$ (0×001). This trap type code $91_0$ is, by the control of the read/write controller 100 shown in FIG. 19, written into the trap type register 110, and is read and transferred to the memory (not shown).

In this conventional operation processing apparatus, the trap map 90 shown in FIG. 20 corresponds to one certain type of operating system (or a system in short), and it has been designed exclusively for this operating system from the beginning. Therefore, when this operation processing apparatus is used in other operating system, the corresponding relation between the trap requests and trap type code is different, and hence malfunction may occur.

To avoid such problem, hitherto, it has been attempted to remake the trap map to be suited to other operating system, or exchange the trap type code at the operating system side. Such measures, however, require must time and cost for remaking of trap map, or may be accompanied by other problems due to exchange of trap type code (lowering of performance), and hence they are not radical solutions for the problems due to difference in operating system.

Furthermore, in the conventional operation processing apparatus, the priority controller 70 shown in FIG. 19 controls the priority corresponding to plural trap requests issued from every execution unit including the integer unit 10, floating point unit 20, . . . , and CPU local bus I/F controller 50.

However, the priority cannot be controlled within the execution unit, and fine control cannot be done. That is, in the conventional operation processing apparatus, the priority cannot be controlled among plural trap requests issued at the same time in the execution unit, and the priority cannot be controlled according to the state of the execution unit.

SUMMARY OF THE INVENTION

It is an object of the present invention to provided an operation processing apparatus capable of applying easily and inexpensively in a plurality of systems (a first object), and executing a fine priority control to trap requests at the execution unit side (a second object).

In the operation processing apparatus according to one object of this invention, a selecting unit selects the first system (or second system), and an encoding unit encodes the trap request according to the first trap map (or second trap map) corresponding to the first system. Thus, the encoding unit has the first trap map and second trap map corresponding to the first system and second system respectively, and the trap map can be changed depending on the system. As a result, this operation processing apparatus can be applied easily and inexpensively in plural systems.

In the operation processing apparatus according to another object of this invention, an encoding unit has the first trap map and second trap map conforming to the first state and second state of the execution unit. Thus, the trap map can be changed depending on the state of the execution unit. As a result, a fine trap request control can be executed depending on the state of the execution unit.

In the operation processing apparatus according to still another object of this invention, a priority control unit selects on the basis of the priority corresponding to the state of the execution unit among plural trap requests in the execution unit, the priority control can be finely executed corresponding to the trap request at the execution unit side.

In the operation processing apparatus according to still another object of this invention, a priority control unit selects on the basis of the priority corresponding to the state of the first execution unit among plural trap requests in the second execution unit. As a result, priority control can be finely executed corresponding to the trap request at the second execution unit side.

In the operation processing apparatus according to still another object of this invention, a priority control unit selects on the basis of the priority corresponding to the state of the first execution unit and the state of the second execution unit among plural trap requests in the second execution unit. As a result, the priority control can be finely executed corresponding to the trap request at the second execution unit side.

Other objects and features of this invention will become apparent from the following description with reference to the accompanying drawings.

DESCRIPTION OF THE PREFERRED EMBODIMENTS

Preferred embodiments of the operation processing apparatus of the invention are described in detail below while referring to the attached drawings.

Figure 1:
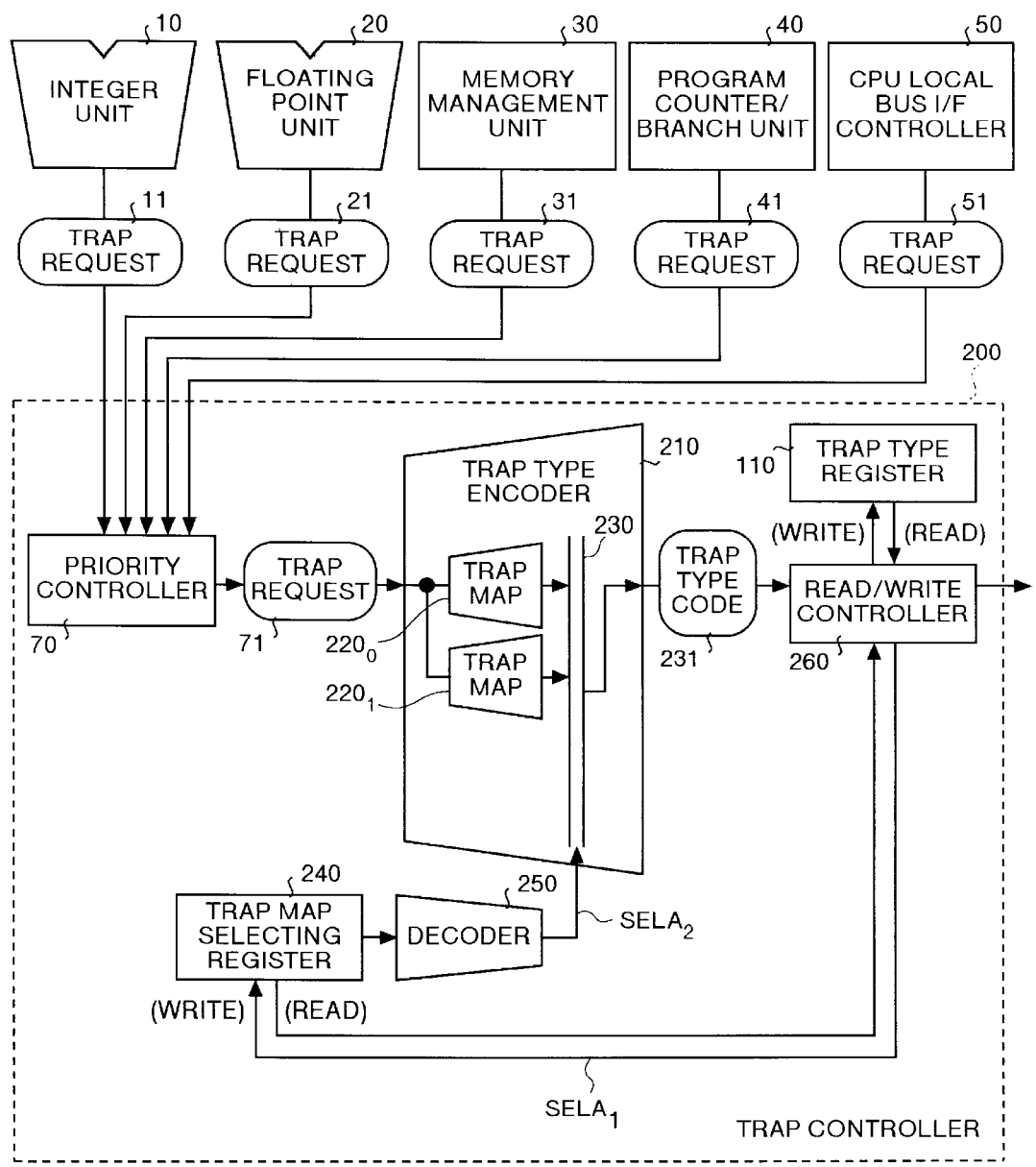
FIG. 1 is a block diagram showing a configuration of a first embodiment of the invention.
Figure 19:
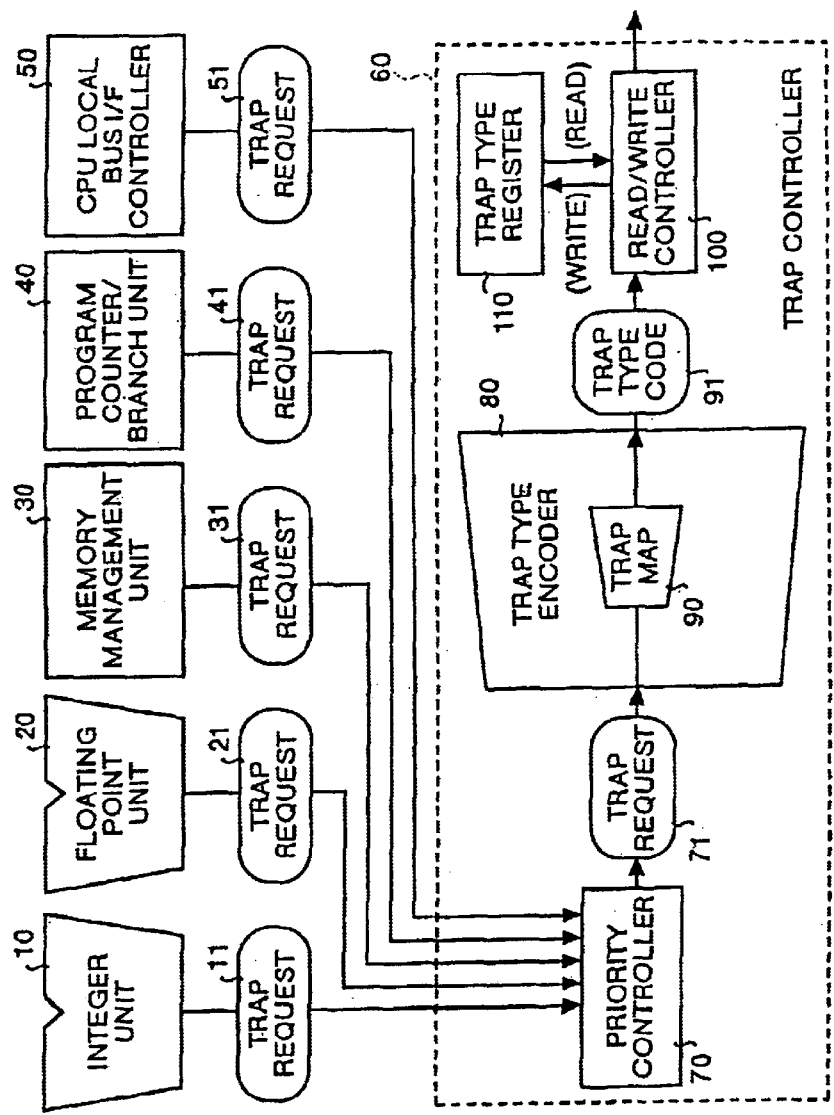
FIG. 19 is a block diagram showing a configuration of a conventional operation processing apparatus.
Figure 20:
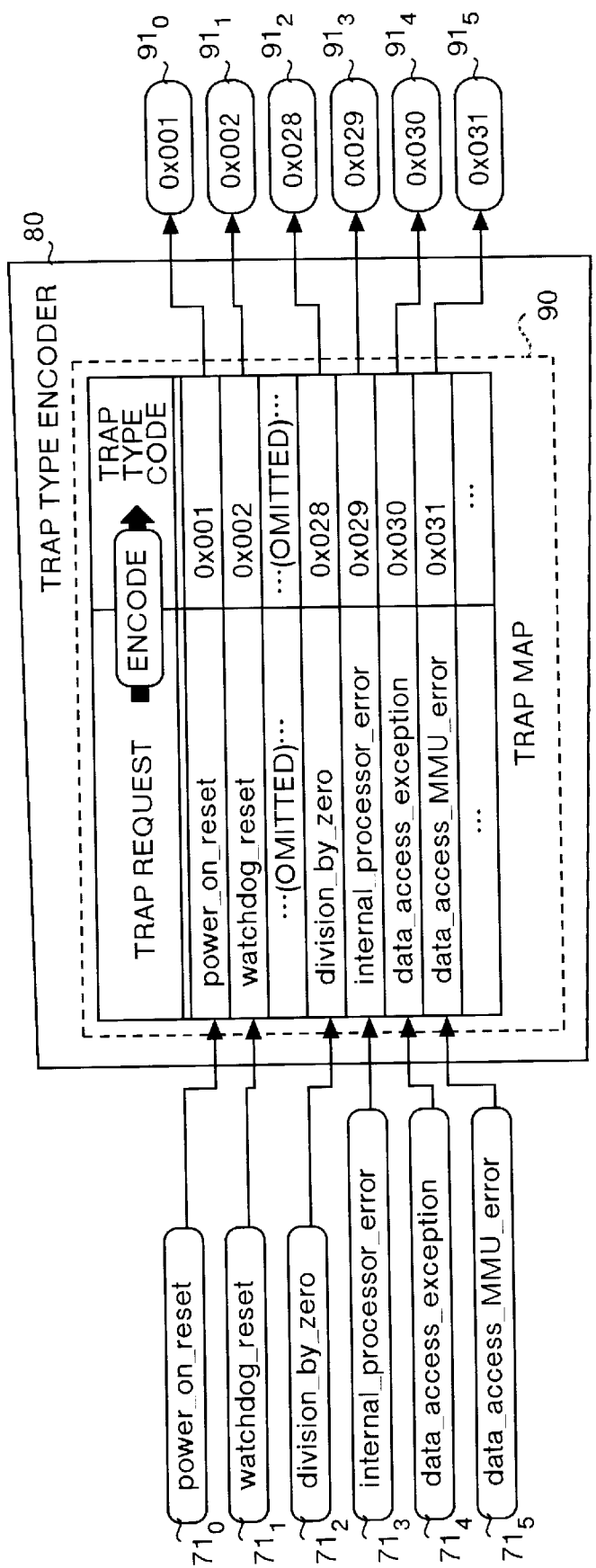
FIG. 20 is a diagram showing a configuration of a trap type encoder 80 shown in FIG. 19.

FIG. 1 is a block diagram showing a configuration of a first embodiment of the invention. In the diagram, the components corresponding to the parts in FIG. 19 are identified with same reference numerals. Herein, instead of the trap controller 60 shown in FIG. 19, a trap controller 200 is provided. In this trap controller 200, instead of the trap type encoder 80 and read/write controller 100 shown in FIG. 19, a trap type encoder 210 and a read/write controller 260 are provided, and also a trap map selecting register 240 and a decoder 250 are newly provided.

The trap type encoder 210 encodes the trap request 71 from the priority controller 70 into trap type code 231 to be processed in the operation processing apparatus, according to one trap map preliminarily selected from two traps maps $220_0$ and $220_1$. Herein, the trap maps $220_0$ and $220_1$ conform to two operating systems (hereinafter called first operating system and second operating system).

Figure 2:
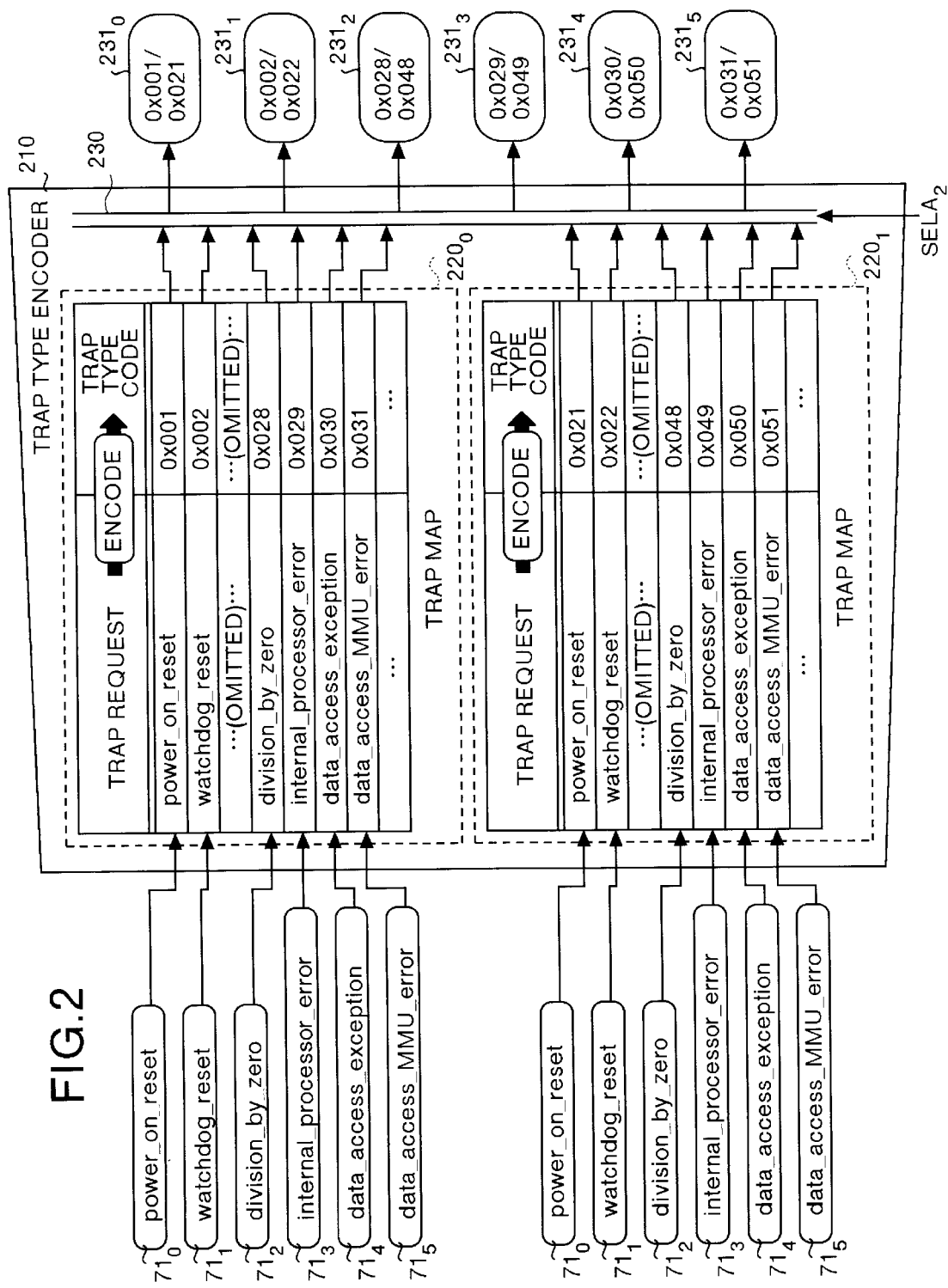
FIG. 2 is a diagram showing a configuration of a trap type encoder 210 shown in FIG. 1.

That is, the trap map $220_0$ shown in FIG. 2 is to define the corresponding relation with the trap type code (0×001) to (0×031) corresponding one by one to the trap request $71_0$ (power#on#reset) to the trap request $71_5$ (data#access#MMU#error) as the trap request 71 (see FIG. 1), and it conforms to the first operating system.

On the other hand, the trap map $220_1$ defines the corresponding relation with the trap type code (0×021) to (0×051) corresponding one by one to the trap request $71_0$ (power#on#reset) to the trap request $71_5$ (data#access#MMU#error) as the trap request 71 (see FIG. 1), but different from the trap map $220_0$, and it conforms to the second operating system. That is, in the first embodiment, depending on the type of the operating system, the conforming trap map is selected.

Referring again to FIG. 1, a multiplexer 230 selects either one of trap map $222_0$ and trap map $220_1$, depending on selection data $SELA_2$. For example, when the trap map $220_0$ shown in FIG. 2 is selected and the trap request $71_0$ is entered, the multiplexer 230 issues trap type code $231_0$ (0×001) of the trap map $220_0$ side.

On the other hand, when the trap map $220_1$ is selected and the trap request $71_0$ is entered, the multiplexer 230 issues trap type code $231_0$ (0×021) of the trap map $220_1$ side. Herein, each one of trap type code $231_0$ to $231_5$ is issued to the read/write controller 260 as the trap type code 231 shown in FIG. 1.

The trap map selecting register 240 writes (or reads) selection data $SELA_1$ by means of the read/write controller 260. This selection data $SELA_1$ is the data for selecting one conforming to the operating system to be used, out of trap map $220_0$ and trap map $220_1$. The decoder 250 decodes the selection data $SELA_1$ written into the trap map selecting register 240, and sends it to the multiplexer 230 as selection data $SELA_2$.

The read/write controller 260 writes the trap type code 231 from the trap type encoder 210 into the trap type register 110, and reads the trap type code 231 from the trap type register 110, and transfers it to a memory (not shown). The read/write controller 260 writes the preset selection data $SELA_1$ into the trap map selecting register 240, and reads the selection data $SELA_1$ from the trap map selecting register 240 as required.

The operation of the first embodiment will now be explained. When the operation processing apparatus shown in FIG. 1 is applied in the first operating system, the read/write controller 260 writes selection data $SELA_1$ for selecting the trap map $220_0$ corresponding to the first operating system into the trap map selecting register 240. This selection data $SELA_1$ is decoded by the decoder 250, and issued to the multiplexer 230 as selection data $SELA_2$. As a result, the trap map $220_0$ is selected in the multiplexer 230.

In this state, when the trap request 11 is issued only from the integer unit 10, the priority controller 70 issues the trap request 11 to the trap type encoder 210 as the trap request 71. In this case, suppose the trap request 71 is the trap request $71_0$ shown in FIG. 2. Consequently, the trap type encoder 210 refers to the trap map $220_0$, encodes the trap request $71_0$ into trap type code $231_0$ (0×001), and issues it to the read/write controller 260.

This trap type code $231_0$ (0×001) is written into the trap type register 110 by the control of the read/write controller 260 shown in FIG. 1, and is then read and transferred to the memory (not shown). In FIG. 2, meanwhile, the trap request $71_0$ is encoded into the trap type code (0×021) according to other trap map $220_1$. In this case, however, since the trap map $220_0$ side is selected by the multiplexer 230, the trap type code (0×021) is not issued.

On the other hand, when the operation processing apparatus is applied in the second operating system, the read/write controller 260 writes selection data $SELA_1$ for selecting the trap map $220_1$ corresponding to the second operating system into the trap map selecting register 240. This selection data $SELA_1$ is decoded by the decoder 250, and issued to the multiplexer 230 as selection data $SELA_2$. As a result, the trap map $220_1$ is selected in the multiplexer 230.

In this state, when the trap request 11 is issued only from the integer unit 10, the priority controller 70 issues the trap request 11 to the trap type encoder 210 as the trap request 71 (for example, trap request $71_0$ (see FIG. 2)). Consequently, the trap type encoder 210 refers to other trap map $220_1$, encodes the trap request $71_0$ into trap type code $231_0$ (0×021), and issues it to the read/write controller 260.

This trap type code $231_0$ (0×021) is written into the trap type register 110 by the control of the read/write controller 260 shown in FIG. 1, and is then read and transferred to the memory (not shown). In FIG. 2, meanwhile, the trap request $71_0$ is encoded into the trap type code (0×001) according to other trap map $220_0$. In this case, contrary to the above case, since the trap map $220_1$ side is selected by the multiplexer 230, the trap type code (0×001) is not issued.

As explained herein, according to the first embodiment, the trap maps $220_0$ and $220_1$ corresponding to plural operating systems are provided in the trap type encoder 210, and the trap map can be changed over depending on the operating system, so that the operation processing apparatus can be easily and inexpensively applied in plural operating systems.

Figure 3:
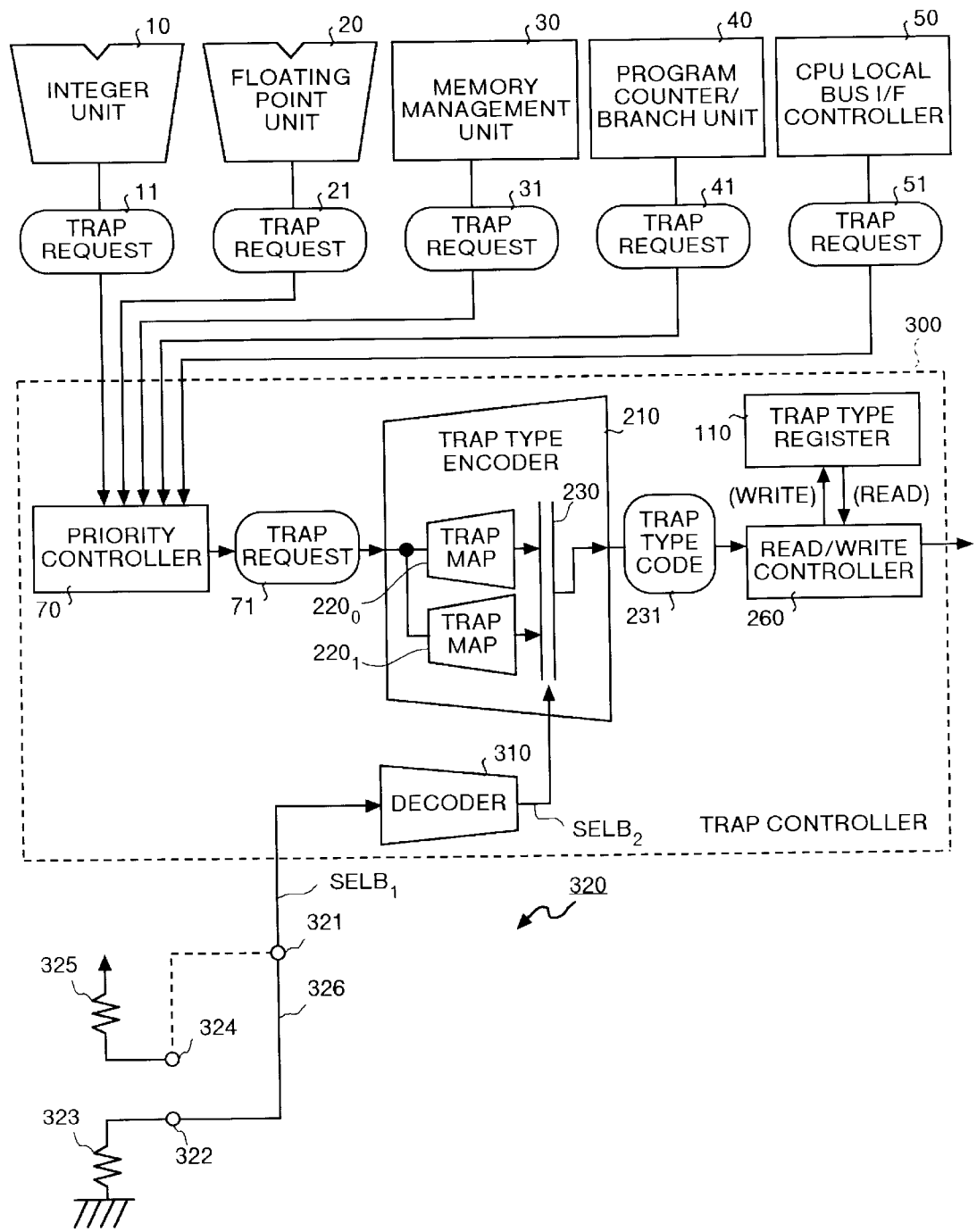
FIG. 3 is a block diagram showing a configuration of a second embodiment of the invention.

In the first embodiment, the trap map is selected on the basis of the internal action of writing selection data $SELA_1$ in the trap map selecting register 240 shown in FIG. 1, but the trap map may be selected on the basis of an external action by using a selector 320 as shown in FIG. 3. Such example of configuration is explained below as a second embodiment.

FIG. 3 is a block diagram showing a configuration of the second embodiment of the invention. In the diagram, the components corresponding to the parts in FIG. 1 are identified with same reference numerals. Herein, instead of the trap controller 200 shown in FIG. 1, a trap controller 300 is provided, and also a selector 320 is newly provided. In this trap controller 300, instead of the trap map selecting register 240 and decoder 250 shown in FIG. 1, a decoder 310 is provided.

The selector 320 is provided as an external mechanism of the trap controller 300, and is designed to set selection data $SELB_1$. This selection data $SELB_1$ is the data for selecting one conforming to the operating system to be used, out of trap map $220_0$ and trap map $220_1$.

The selector 320 comprises a terminal 321, a terminal 322 grounded through a pull-down resistor 323, a terminal 324 connected to the power source through a pull-up resistor 325, and a jumper wire 326 connecting between terminal 321 and terminal 322 or between terminal 321 and terminal 324.

This jumper wire 326 is connected between terminal 321 and terminal 322 when setting selection data $SELB_1$ for selecting the trap map $220_0$ conforming to the first operating system, or between terminal 321 and terminal 324 when setting selection data $SELB_1$ for selecting the trap map $220_1$ conforming to the second operating system. In the trap controller 300, the decoder 310 decodes the selection data $SELB_1$ into selection data $SELB_2$. In the second embodiment, the multiplexer 230 selects either trap map $220_0$ or trap map $220_1$, by the selection data $SELB_2$.

The operation of the second embodiment will now be explained. When the operation processing apparatus shown in FIG. 3 is applied in the first operating system, the jumper wire 326 is connected between terminal 321 and terminal 322. Accordingly, the selector 320 sends out the selection data $SELB_1$ for selecting the trap map $220_0$ to the decoder 310. This selection data $SELB_1$ is decoded by the decoder 310, and is issued to the multiplexer 230 as selection data SELB$_2$. As a result, the trap map 220$_0$ is selected in the multiplexer 230.

In this state, when the trap request 11 is issued only from the integer unit 10, the priority controller 70 issues the trap request 11 to the trap type encoder 210 as the trap request 71. In this case, suppose the trap request 71 is the trap request 71$_0$ shown in FIG. 2.

Hereinafter, same as in the first embodiment, the trap type encoder 210 refers to the trap map 220$_0$, encodes the trap request 71$_0$ into trap type code 231$_0$ (0×001), and issues it to the read/write controller 260. This trap type code 231$_0$ (0×001) is written into the trap type register 110 by the control of the read/write controller 260 shown in FIG. 3, and is then read and transferred to the memory (not shown).

On the other hand, when the operation processing apparatus is applied in the second operating system, the jumper wire 326 is connected between terminal 321 and terminal 324. Accordingly, the selector 320 sends out the selection data SELB$_1$ for selecting the trap map 220$_1$ to the decoder 310. This selection data SELB$_1$ is decoded by the decoder 310, and is issued to the multiplexer 230 as selection data SELB$_2$. As a result, the trap map 220$_1$ is selected in the multiplexer 230.

In this state, when the trap request 11 is issued only from the integer unit 10, the priority controller 70 issues the trap request 11 to the trap type encoder 210 as the trap request 71 (for example, trap request 71$_0$ (see FIG. 2)). Hereinafter, same as in the first embodiment, the trap type encoder 210 refers to other trap map 220$_1$, encodes the trap request 71$_0$ into trap type code 231$_0$ (0×021), and issues it to the read/write controller 260. This trap type code 231$_0$ (0×021) is written into the trap type register 110 by the control of the read/write controller 260 shown in FIG. 3, and is then read and transferred to the memory (not shown).

In the first embodiment, either the trap map 220$_0$ or the trap map 220$_1$ is selected by the selection data SELA$_1$ shown in FIG. 1, but it may be also designed to select either the trap map 220$_0$ or the trap map 220$_1$ depending on the two statuses (states) of the execution unit. Such example of configuration is explained below as a third embodiment. Herein, the execution unit is any one of the integer unit 10, floating point unit 20, memory management unit 30, program counter/branch unit 40, and CPU local bus I/F controller 50 shown in FIG. 1.

Figure 4:
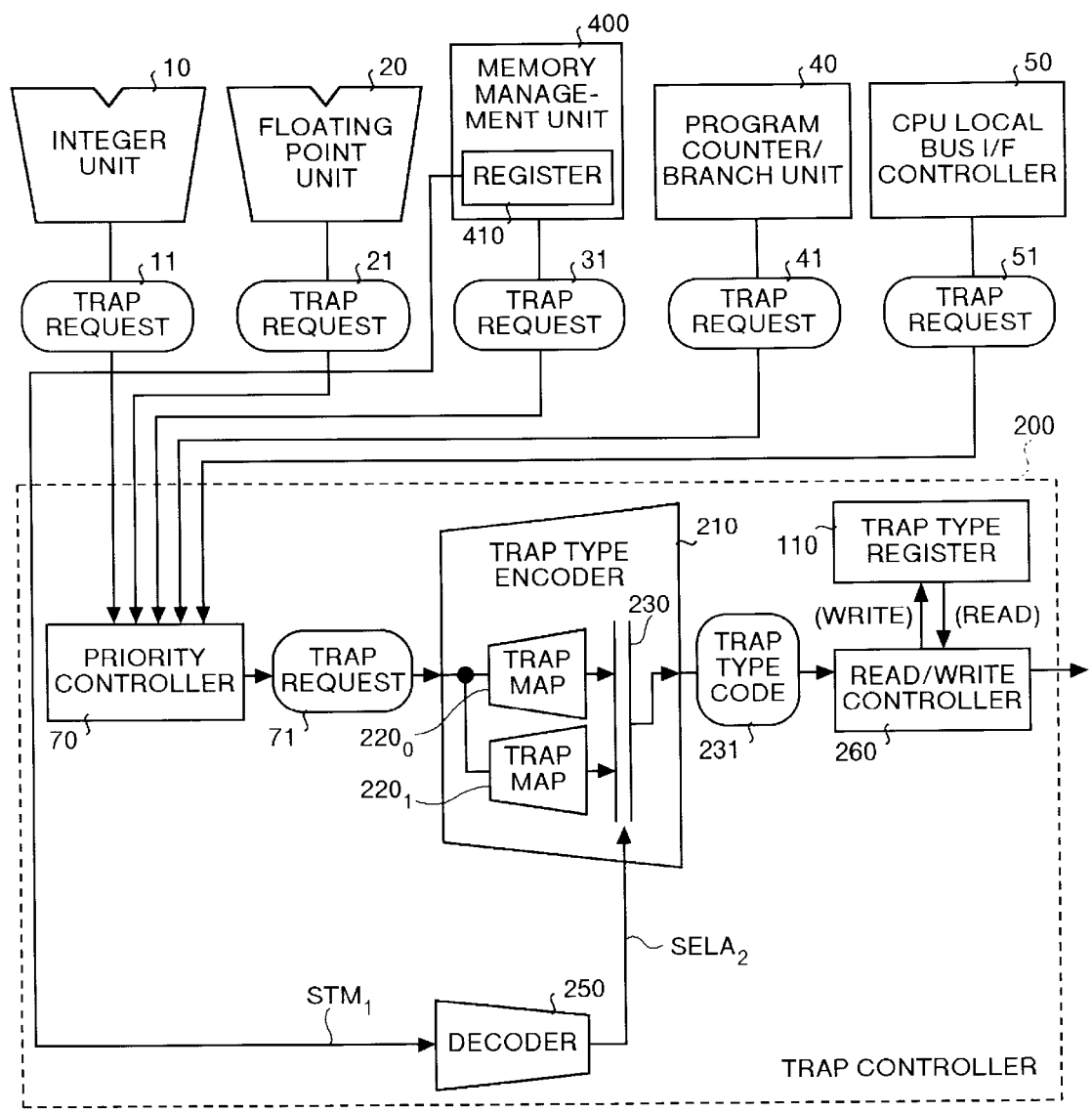
FIG. 4 is a block diagram showing a configuration of a third embodiment of the invention.

FIG. 4 is a block diagram showing a configuration of the third embodiment of the invention. In the diagram, the components corresponding to the parts in FIG. 1 are identified with same reference numerals in FIG. 4, instead of the memory management unit 30 shown in FIG. 1, a memory management unit 400 (execution unit) is provided. In the trap controller 200 shown in FIG. 4, however, the trap map selecting register 240 shown in FIG. 1 is not provided.

The memory management unit 400, same as the memory management unit 30 (see FIG. 1), converts mutually between virtual address and physical address, and controls access to a cache memory (not shown), and it also issues a trap request 31 as required. The memory controller 400 comprises a register 410. In this register 410, status data STM$_1$ showing the status (state) of the memory management unit 400 is stored. The status is classified into a status corresponding to normal state of the memory management unit 30 (called first status) and a status corresponding to other than normal status (called second status).

The status data STM$_1$ is the data for selecting one corresponding to the status of the memory management unit 400, out of the trap map 220$_0$ and trap map 220$_1$. For example, when the status data STM$_1$ expresses the first status (normal), this status data STM$_1$ is the data for selecting the trap map 220$_0$. On the other hand, when the status data STM$_1$ expresses the second state (other than normal), this status data STM$_1$ is the data for selecting the trap map 220$_1$. In the third embodiment, the decoder 250 decodes the status data STM$_1$ into selection data SELA$_2$.

The operation of the third embodiment is explained. When the status of the memory management unit 400 shown in FIG. 4 is the first status (normal), the memory management unit 400 stores the status data STM$_1$ expressing the first status in the register 410. This status data STM$_1$ is decoded by the decoder 250, and is issued to the multiplexer 230 as selection data SELA$_2$. As a result, the trap map 220$_0$ is selected in the multiplexer 230.

In this state, when the trap request 11 is issued only from the integer unit 10, the priority controller 70 issues the trap request 11 to the trap type encoder 210 as the trap request 71. In this case, suppose the trap request 71 is the trap request 71$_0$ shown in FIG. 2.

Hereinafter, same as in the first embodiment, the trap type encoder 210 refers to the trap map 220$_0$, encodes the trap request 71$_0$ into trap type code 231$_0$ (0×001), and issues it to the read/write controller 260. This trap type code 231$_0$ (0×001) is written into the trap type register 110 by the control of the read/write controller 260 shown in FIG. 4, and is then read and transferred to the memory (not shown).

On the other hand, when the status of the memory management unit 400 is changed from the first status (normal) to the second status (other than normal), the memory management unit 400 stores the status data STM$_1$ expressing the second status in the register 410. This status data STM$_1$ is decoded by the decoder 250, and is issued to the multiplexer 230 as selection data SELA$_2$. As a result, the trap map 220$_1$ is selected in the multiplexer 230.

In this state, when the trap request 11 is issued only from the integer unit 10, the priority controller 70 issues the trap request 11 to the trap type encoder 210 as the trap request 71 (for example, trap request 71$_0$ (see FIG. 2)).

Hereinafter, same as in the first embodiment, the trap type encoder 210 refers to other trap map 220$_1$, encodes the trap request 71$_0$ into trap type code 231$_0$ (0×021), and issues it to the read/write controller 260. This trap type code 231$_0$ (0×021) is written into the trap type register 110 by the control of the read/write controller 260 shown in FIG. 4, and is then read and transferred to the memory (not shown).

In the third embodiment, the execution unit is the memory management unit 400, but in other execution unit than the memory management unit 400 (integer unit 10, floating point unit 20, program counter/branch unit 40, or CPU local bus I/F controller 50), a same register as the register 410 may be provided, and the trap map may be selected depending on the status of the execution unit.

As explained herein, according to the third embodiment, the trap maps 220$_0$ and 220$_1$ conforming to the states of the memory management unit 400 (execution unit) are provided in the trap type encoder 210, and the trap map can be changed over depending on the state of the memory management unit 400 (execution unit), and therefore the trap request can be controlled finely depending on the state of the execution unit.

In the first embodiment, one is selected from two trap maps 220$_0$ and 220$_1$ shown in FIG. 1 conforming to two operating systems, but it may be also designed to select one from n types of (three or more) trap maps conforming to n types of operating systems. Such example is explained below as a fourth embodiment.

Figure 5:
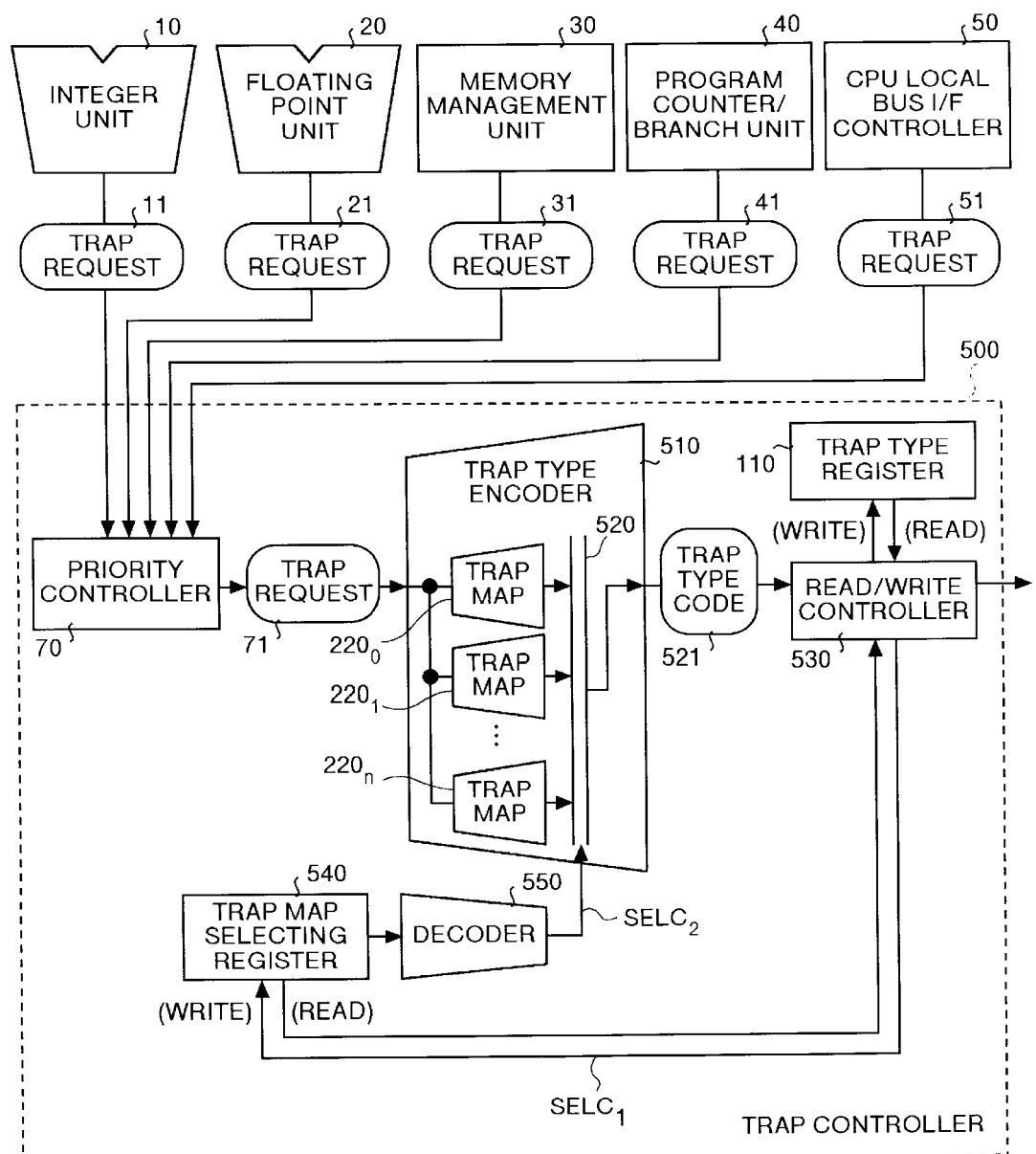
FIG. 5 is a block diagram showing a configuration of a fourth embodiment of the invention.

FIG. 5 is a block diagram showing a configuration of the fourth embodiment of the invention. In the diagram, the components corresponding to the parts in FIG. 1 are identified with same reference numerals. Herein, instead of the trap controller 200 shown in FIG. 1, a trap controller 500 is provided. In this trap controller 500, instead of the trap type encoder 210, trap map selecting register 240, decoder 250, and read/write controller 260 shown in FIG. 1, trap type encoder 510, read/write controller 530, trap map selecting register 540, and decoder 550 are provided.

The trap type encoder 510 encodes the trap request 71 from the priority controller 70 into trap type code 521 to be processed in the operation processing apparatus, according to one trap map of n types of trap maps $220_0$, $220_1$, ..., $220_n$. These trap maps $220_0$, $220_1$, ..., $220_n$ conform to n types of operating systems respectively (hereinafter called first operating system, second operating system, ..., n-th operating system).

The multiplexer 520 selects one of the trap maps $220_0$, $220_1$, ..., $220_n$ by selection data $SELC_2$. For example, when the trap map $220_1$ is selected and the trap request 71 is entered, the multiplexer 520 issues trap type code 521 encoded according to the trap map $220_1$. Similarly, when the trap map $220_n$ is selected and the trap request 71 is entered, the multiplexer 520 issues trap type code 521 encoded according to the trap map $220_n$.

The trap map selecting register 540 writes (or reads) the selection data $SELC_1$ according to the read/write controller 530. This selection data $SELC_1$ is the data for selecting one conforming to the operating system to be used form the trap maps $220_0$, $220_1$, ..., $220_n$. The decoder 550 decodes the selection data $SELC_1$ written in the trap map selecting register 540, and issues it to the multiplexer 520 as selection data $SELC_2$.

The read/write controller 530 writes the trap type code 521 from the trap type encoder 510 into the trap type register 110, and reads the trap type code 521 from the trap type register 110, then transfers it to a memory (not shown). The read/write controller 530 also write the preset selection data $SELC_1$ into the trap map selecting register 540, and reads the selection data $SELC_1$ from the trap map selection register 540 as required.

The operation of the fourth embodiment will now be explained. When the operation processing apparatus shown in FIG. 5 is applied in the first operating system, the read/write controller 530 writes selection data $SELC_1$ for selecting the trap map $220_0$ corresponding to the first operating system into the trap map selecting register 540. This selection data $SELC_1$ is decoded by the decoder 550, and issued to the multiplexer 520 as selection data $SELC_2$. As a result, the trap map $220_0$ is selected in the multiplexer 520.

In this state, when the trap request 11 is issued only from the integer unit 10, the priority controller 70 issues the trap request 11 to the trap type encoder 510 as the trap request 71. Thus, same as in the first embodiment, the trap type encoder 510 refers to the trap map $220_0$, encodes the trap request 71 into trap type code 521, and issues it to the read/write controller 530. This trap type code 521 is written into the trap type register 110 by the control of the read/write controller 530, and is then read and transferred to the memory (not shown).

On the other hand, when the operation processing apparatus is applied in the n-th operating system, the read/write controller 530 writes selection data $SELC_1$ for selecting the trap map $220_n$ corresponding to the n-th operating system into the trap map selecting register 540. This selection data $SELC_1$ is decoded by the decoder 550, and issued to the multiplexer 520 as selection data $SELC_2$. As a result, the trap map $220_n$ is selected in the multiplexer 520.

In this state, when the trap request 11 is issued only from the integer unit 10, the priority controller 70 issues the trap request 11 to the trap type encoder 510 as the trap request 71. Consequently, the trap type encoder 510 refers to the trap map $220_n$, encodes the trap request 71 into trap type code 521, and issues it to the read/write controller 530. This trap type code 521 is written into the trap type register 110 by the control of the read/write controller 530, and is then read and transferred to the memory (not shown).

Figure 6:
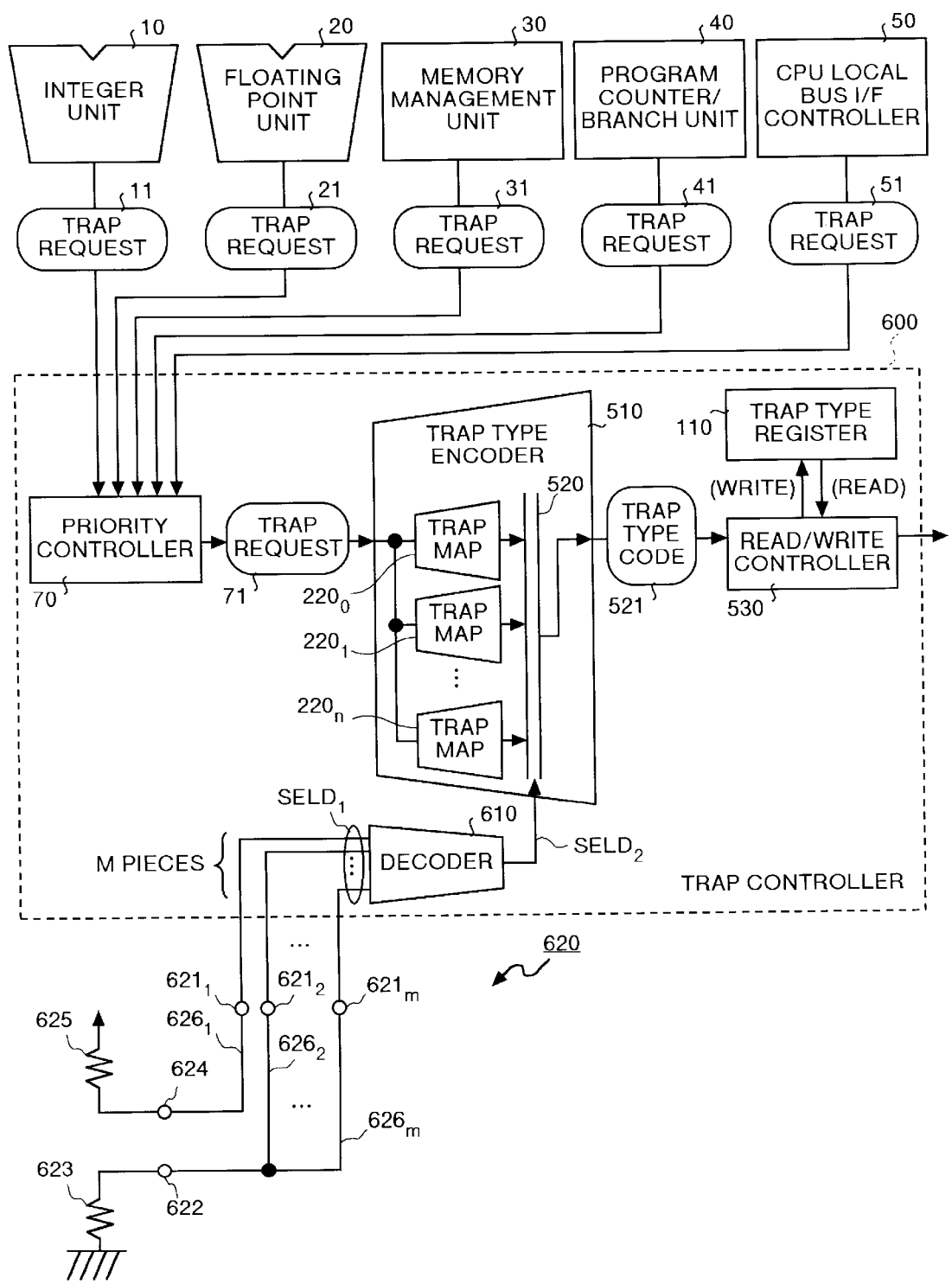
FIG. 6 is a block diagram showing a configuration of a fifth embodiment of the invention.

In the fourth embodiment, the trap map is selected on the basis of the internal action of writing selection data $SELC_1$ in the trap map selecting register 540 shown in FIG. 5, but the trap map may be selected on the basis of an external action by using a selector 620 as shown in FIG. 6 same as in the second embodiment. Such example of configuration is explained below as a fifth embodiment.

FIG. 6 is a block diagram showing a configuration of the fifth embodiment of the invention. In the diagram, the components corresponding to the parts in FIG. 5 are identified with same reference numerals. Herein, instead of the trap controller 500 shown in FIG. 5, a trap controller 600 is provided, and also a selector 620 is newly provided. In this trap controller 600, instead of the trap map selecting register 540 and decoder 550 shown in FIG. 5, a decoder 610 is provided.

The selector 620 is provided as an external mechanism of the trap controller 600, and is designed to set selection data $SELD_1$. This selection data $SELD_1$ is composed of m bits, and is the data for selecting one conforming to the operating system to be used, out of trap maps $220_0$, $220_1$, ..., $220_n$.

The selector 620 comprises m terminals $621_1$ to $621_m$, a terminal 622 grounded through a pull-down resistor 623, a terminal 624 connected to the power source through a pull-up resistor 625, and m jumper wires $326_1$ to $316_m$ connecting between terminal $621_1$ and terminal 622 (or terminal 624), ..., and between terminal $621_m$ and terminal 622 (or terminal 624).

In the fifth embodiment, depending on the combination of connection of these jumper wires $326_1$ to $326_m$ (connected to the pull-down resistor 623 side or connected to the pull-up resistor 625 side), the m-bit selection data $SELD_1$ is expressed by "0" or "1". For example, when all of the jumper wires $626_1$ to $626_m$ are connected to the terminal 622 (grounding side), the selection data $SELD_1$ is expressed as "0000 ... 000" (all 0), and it is the data for selecting the trap map $220_0$.

The operation of the fifth embodiment is explained. When the operation processing apparatus shown in FIG. 6 is applied in the first operating system, all of jumper wires $626_1$ to $626_m$ are connected between terminals $621_1$ to $621_m$ and terminal 622. Accordingly, the selector 620 sends out the selection data $SELD_1$ for selecting the trap map $220_0$ to the decoder 610. This selection data $SELD_1$ is decoded by the decoder 610, and is issued to the multiplexer 520 as selection data $SELD_2$. As a result, the trap map $220_0$ is selected in the multiplexer 520.

In this state, when the trap request 11 is issued only from the integer unit 10, the priority controller 70 issues the trap request 11 to the trap type encoder 510 as the trap request 71. Consequently, the trap type encoder 510 refers to the trap map $220_0$, encodes the trap request 71 into trap type code 521, and issues it to the read/write controller 530. This trap type code 521 is written into the trap type register 110 by the control of the read/write controller 530, and is then read and transferred to the memory (not shown).

On the other hand, when the operation processing apparatus is applied in the n-th operating system, each one of the jumper wires $626_1$ to $626_m$ is connected between terminals $621_1$ to $621_m$ and terminal 622 (terminal 624) in the combination corresponding to the trap map $220_n$. Accordingly, the selector 620 sends out the selection data $SELD_1$ for selecting the trap map $220_n$ to the decoder 610. This selection data $SELD_1$ is decoded by the decoder 610, and is issued to the multiplexer 520 as selection data $SELD_2$. As a result, the trap map $220_n$ is selected in the multiplexer 520.

In this state, when the trap request 11 is issued only from the integer unit 10, the priority controller 70 issues the trap request 11 to the trap type encoder 510 as the trap request 71. Hereinafter, the trap type encoder 510 refers to the trap map $220_n$, encodes the trap request 71 into trap type code 521, and issues it to the read/write controller 530. This trap type code 521 is written into the trap type register 110 by the control of the read/write controller 530 shown in FIG. 6, and is then read and transferred to the memory (not shown).

In the fourth embodiment, one of the trap maps $220_0$, $220_1$, . . . , $220_n$ is selected by the selection data $SELC_1$ shown in FIG. 5, but it may be also designed to select one of the trap maps $220_0$, $220_1$, . . . , $220_n$ depending on n types of status (state) of the execution unit. Such example of configuration is explained below as a sixth embodiment.

Figure 7:
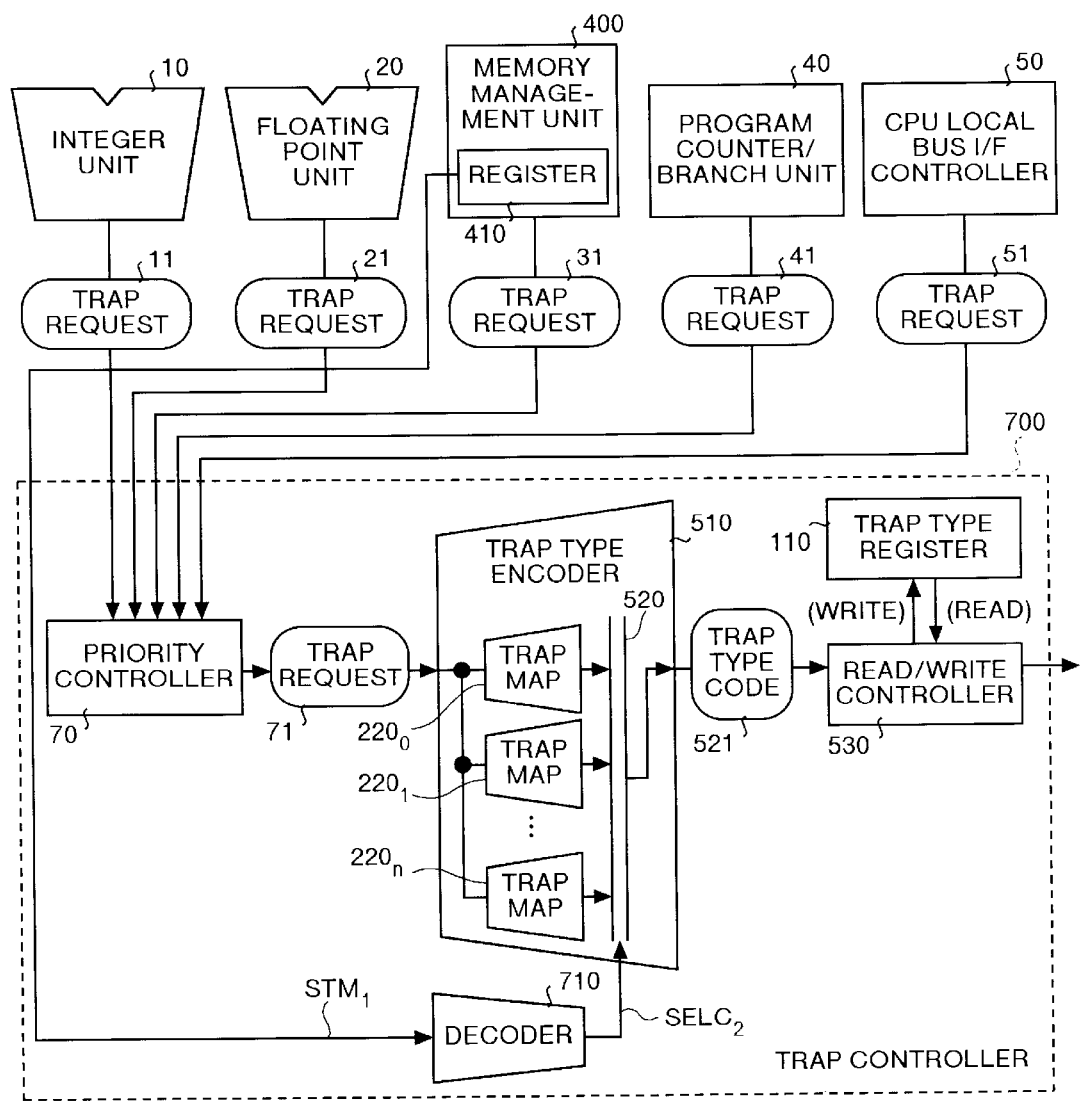
FIG. 7 is a block diagram showing a configuration of a sixth embodiment of the invention.

FIG. 7 is a block diagram showing a configuration of the sixth embodiment of the invention. In the diagram, the components corresponding to the parts in FIG. 5 and FIG. 4 are identified with same reference numerals. In FIG. 7, instead of the memory management unit 30 shown in FIG. 5, a memory management unit 400 (execution unit: see FIG. 4) is provided. In the trap controller 700 shown in FIG. 7, moreover, instead of the trap map selecting register 540 and decoder 550 shown in FIG. 5, a decoder 710 is provided.

The memory management unit 400, same as the memory management unit 30 (see FIG. 5), converts mutually between virtual address and physical address, and controls access to a cache memory (not shown), and it also issues a trap request 31 as required. The memory controller 400 comprises a register 410. In this register 410, status data $STM_1$ showing n types of status (state) of the memory management unit 400 is stored. The status includes n types of first status, second status, . . . , n-th status.

The status data $STM_1$ is the data for selecting one corresponding to the status of the memory management unit 400, out of the trap maps $220_0$, $220_1$, . . . , $220_n$. For example, when the status data $STM_1$ expresses the first status, this status data $STM_1$ is the data for selecting the trap map $220_0$. Similarly, when the status data $STM_1$ expresses the n-th state, this status data $STM_1$ is the data for selecting the trap map $220_n$. The decoder 710 decodes the status data $STM_1$ into selection data $SELC_2$.

The operation of the sixth embodiment will now be explained. When the status of the memory management unit 400 shown in FIG. 7 is the first status, the memory management unit 400 stores the status data $STM_1$ expressing the first status in the register 410. This status data $STM_1$ is decoded by the decoder 710, and is issued to the multiplexer 520 as selection data $SELC_2$. As a result, the trap map $220_0$ is selected in the multiplexer 520.

In this state, when the trap request 11 is issued only from the integer unit 10, the priority controller 70 issues the trap request 11 to the trap type encoder 510 as the trap request 71. Then, the trap type encoder 510 refers to the trap map $220_0$, encodes the trap request 71 into trap type code 521, and issues it to the read/write controller 530. This trap type code 521 is written into the trap type register 110 by the control of the read/write controller 530, and is then read and transferred to the memory (not shown).

When the status of the memory management unit 400 is changed from the first status to the n-th status, the memory management unit 400 stores the status data $STM_1$ expressing the n-th status in the register 410. This status data $STM_1$ is decoded by the decoder 710, and is issued to the multiplexer 520 as selection data $SELC_2$. As a result, the trap map $220_n$ is selected in the multiplexer 520.

In this state, when the trap request 11 is issued only from the integer unit 10, the priority controller 70 issues the trap request 11 to the trap type encoder 510 as the trap request 71. Then, the trap type encoder 510 refers to the trap map $220_n$, encodes the trap request 71 into trap type code 521, and issues it to the read/write controller 530. This trap type code 521 is written into the trap type register 110 by the control of the read/write controller 530, and is then read and transferred to the memory (not shown).

In the sixth embodiment, the execution unit is the memory management unit 400, but in other execution unit than the memory management unit 400 (integer unit 10, floating point unit 20, program counter/branch unit 40, or CPU local bus I/F controller 50), a same register as the register 410 may be provided, and the trap map may be selected depending on the status of the execution unit.

In the first to sixth embodiments, the priority is controlled by the priority controller 70 (see FIG. 1), on plural trap requests issued from each execution unit including the integer unit 10, floating point unit 20, . . . , CPU local bus I/F controller 50, but it may be also designed to control the priority within the execution unit. Such example is explained as a seventh embodiment below.

Figure 8:
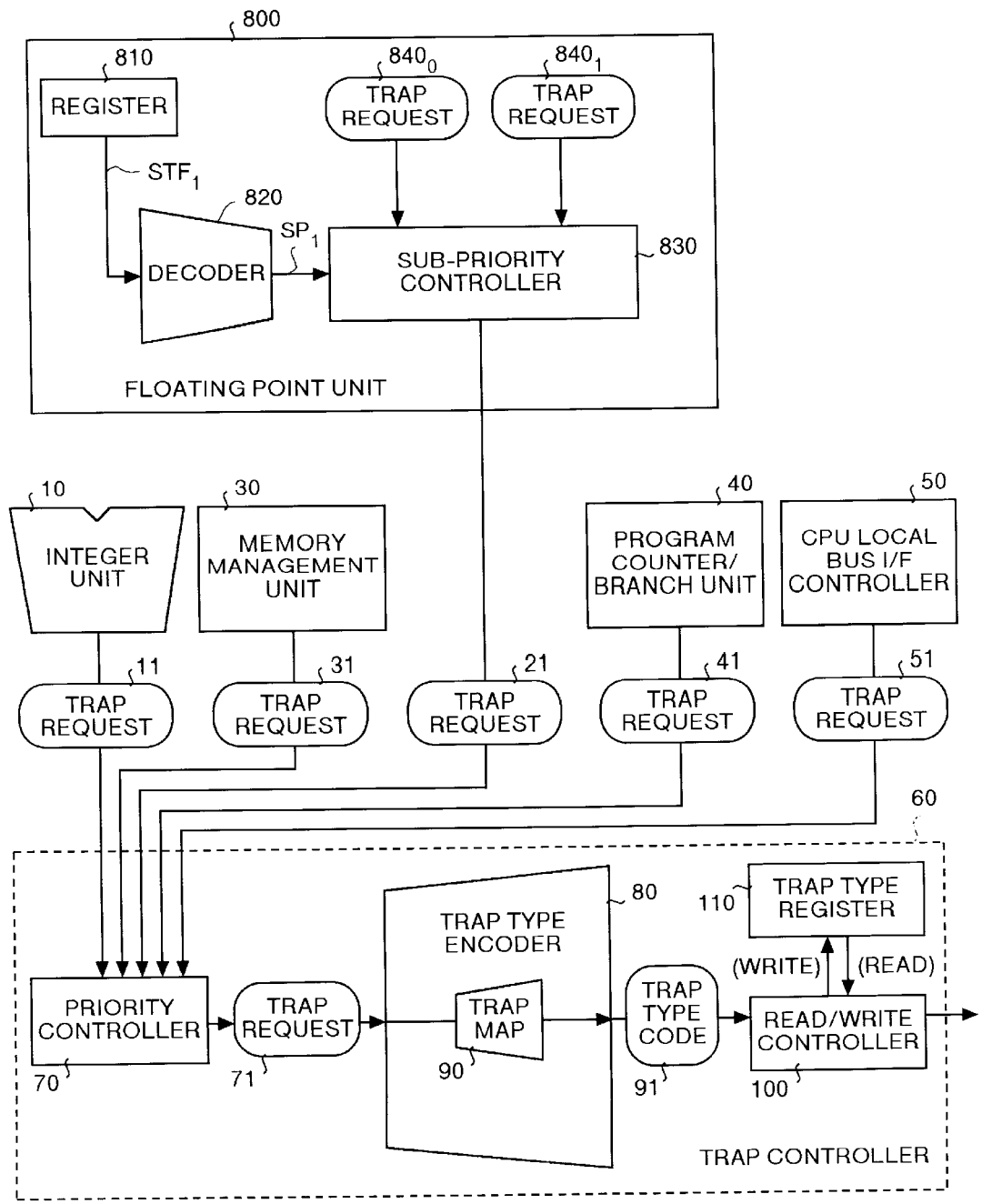
FIG. 8 is a block diagram showing a configuration of a seventh embodiment of the invention.

FIG. 8 is a block diagram showing a configuration of the seventh embodiment of the invention. In the diagram, same components as in parts in FIG. 19 are identified with same reference numerals. Herein, instead of the floating point unit 20 shown in FIG. 19, a floating point unit 800 as execution unit is provided. This floating point unit 800, same as the floating point unit 20 (see FIG. 19), is an operator for executing floating point operation according to a floating point operation command, and issues trap request 21 as required.

The floating point unit 800 comprises a register 810, a decoder 820, and sub-priority controller 830. In the register 810 shown in FIG. 9, status data $STF_1$ expressing the status (state) of the floating point unit 800 is stored. An example of this status is whether the floating point unit 800 is in a state for operating in compliance with IEEE (Institute of Electrical and Electronics Engineers) 754 or not.

When the floating point unit 800 is in a state for operating in compliance with IEEE754, ieee#mode=1 is stored in the register 810 as status data $STF_1$. On the other hand, when the floating point unit 800 is in a state for operating other than IEEE754, ieee#mode=0 is stored in the register 810 as status data $STF_1$. The decoder 820 decodes the status data $STF_1$, and issues it as selection data $SP_1$.

This selection data $SP_1$ is the data for selecting either one of trap request $840_0$ (fp#exception#ieee#754) and trap request $840_1$ (fp#exception#other) by the multiplexer 832. Specifically, when the status data $STF_1$ is ieee#mode=1, the multiplexer 832 selects the trap request $840_0$ which is the output of the priority encoder $831_0$, and sends it to the priority controller 70 as the trap request 21 (see FIG. 8).

On the other hand, when the status data $STF_1$ is ieee#mode=0, the multiplexer 832 selects the trap request $840_1$ which is the output of the priority encoder $831_1$, and sends it to the priority controller 70 as the trap request 21 (see FIG. 8). Herein, the trap request $840_0$ conforms to IEEE754, and the trap request $840_1$ does not conform to IEEE754.

The priority encoder $831_0$, when the trap request $840_0$ and trap request $840_1$ are entered at the same time, encodes the trap request $840_0$ by priority. On the other than, the priority encoder $831_1$, when the trap request $840_0$ and trap request $840_1$ are entered at the same time, encodes the trap request $840_1$ by priority.

Figure 9:
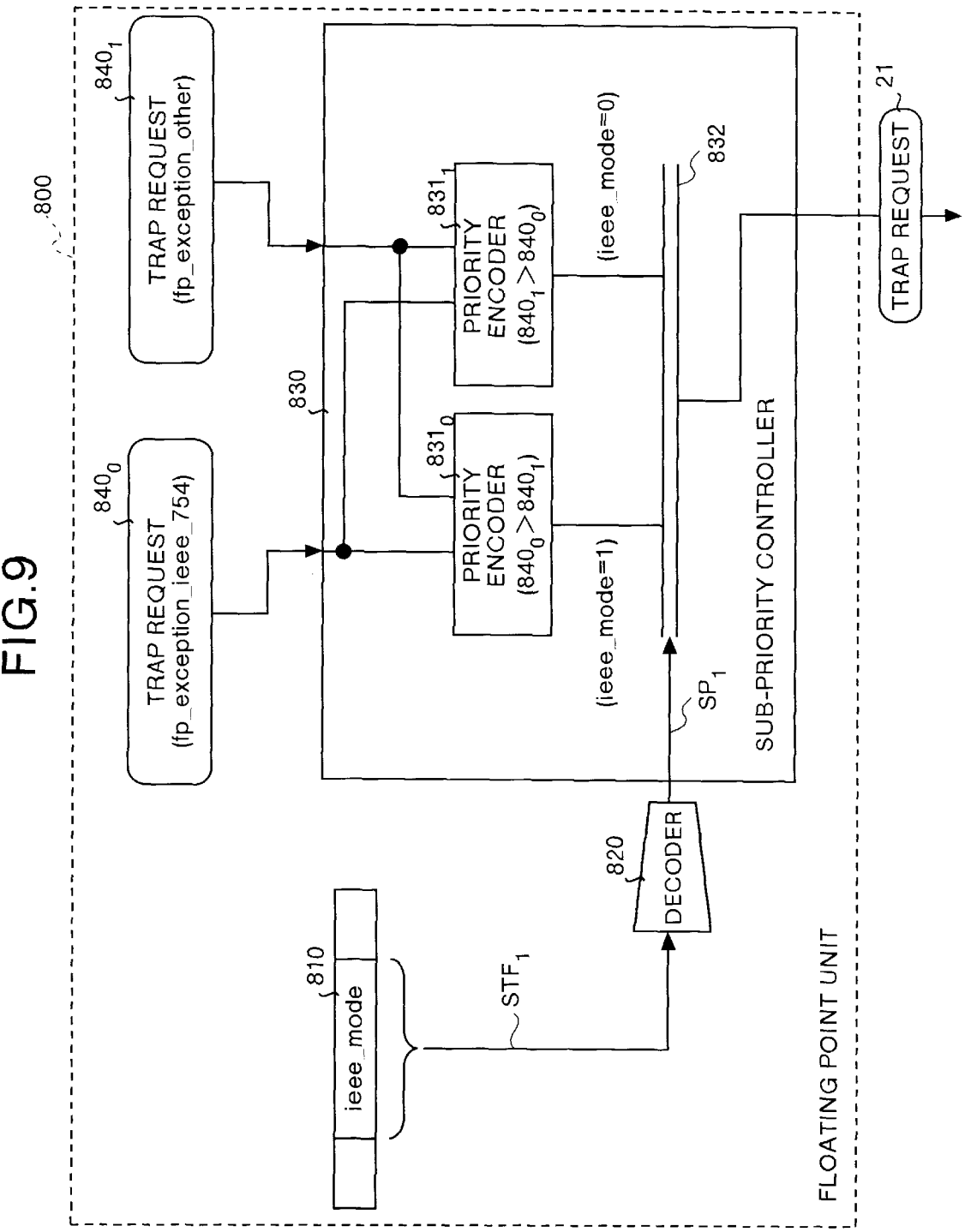
FIG. 9 is a diagram showing a configuration of a floating point unit 800 shown in FIG. 8.

The operation of the seventh embodiment will now be explained. In FIG. 9, in the case of operation in compliance with IEEE754, the floating point unit 800 stores ieee#mode=1 in the register 810 as status data $STF_1$. This status data $STF_1$ is decoded by the decoder 820, and is issued to the multiplexer 832 as selection data $SP_1$. As a result, the priority encoder $831_0$ side is selected in the multiplexer 832.

In this state, when the trap request $840_0$ and trap request $840_1$ are given at the same time, the priority encoder $831_0$ encodes the trap request $840_0$ by priority. On the other hand, the priority encoder $831_1$ encodes the trap request $840_1$ by priority.

In this case, since the priority encoder $831_0$ side is selected by the multiplexer 832, the trap request $840_0$ is issued from the multiplexer 832 to the priority controller 70 shown in FIG. 8 as the trap request 21. Thereafter, by the same operation as mentioned above, the trap request 21 is fed into the trap type encoder 80 as trap request 71, and the trap type code 91 conforming to the trap map 90 is issued from the trap type encoder 80 to the read/write controller 100.

In FIG. 9, in the case of operation other than IEEE754, the floating point unit 800 stores ieee#mode=0 in the register 810 as status data $STF_1$. This status data $STF_1$ is decoded by the decoder 820, and is issued to the multiplexer 832 as selection data $SP_1$. As a result, the priority encoder $831_1$ side is selected in the multiplexer 832.

In this state, when the trap request $840_0$ and trap request $840_1$ are given at the same time, the priority encoder $831_0$ encodes the trap request $840_0$ by priority, while the priority encoder $831_1$ encodes the trap request $840_1$ by priority.

In this case, since the priority encoder $831_1$ side is selected by the multiplexer 832, the trap request $840_1$ is issued from the multiplexer 832 to the priority controller 70 shown in FIG. 8 as the trap request 21. Thereafter, by the same operation as mentioned above, the trap request 21 is fed into the trap type encoder 80 as trap request 71, and the trap type code 91 conforming to the trap map 90 is issued from the trap type encoder 80 to the read/write controller 100.

In the seventh embodiment, the execution unit is the floating point unit 800, but, alternatively, other execution unit than the floating point unit 800 (integer unit 10, memory management unit 30, program counter/branch unit 40, or CPU local bus I/F controller 50) may be provided with the same function as the floating point unit 800, and the trap request may be controlled by priority depending on the status of the execution unit.

As explained herein, according to the seventh embodiment, since either one of the plural tarp requests $840_0$ and $840_1$ in the floating point unit 800 (execution unit) is selected on the basis of the priority corresponding to the state of the sub-priority controller 830 (execution unit) by means of the sub-priority controller 830, the priority control on the trap request can be executed finely at the execution unit side.

In the seventh embodiment, the priority is controlled by the floating point unit 800 (execution unit) shown in FIG. 8, on two trap requests $840_0$ and $840_1$, but it may be also designed to control priority on n types (three or more) of trap requests. Such example is explained as an eighth embodiment below.

Figure 10:
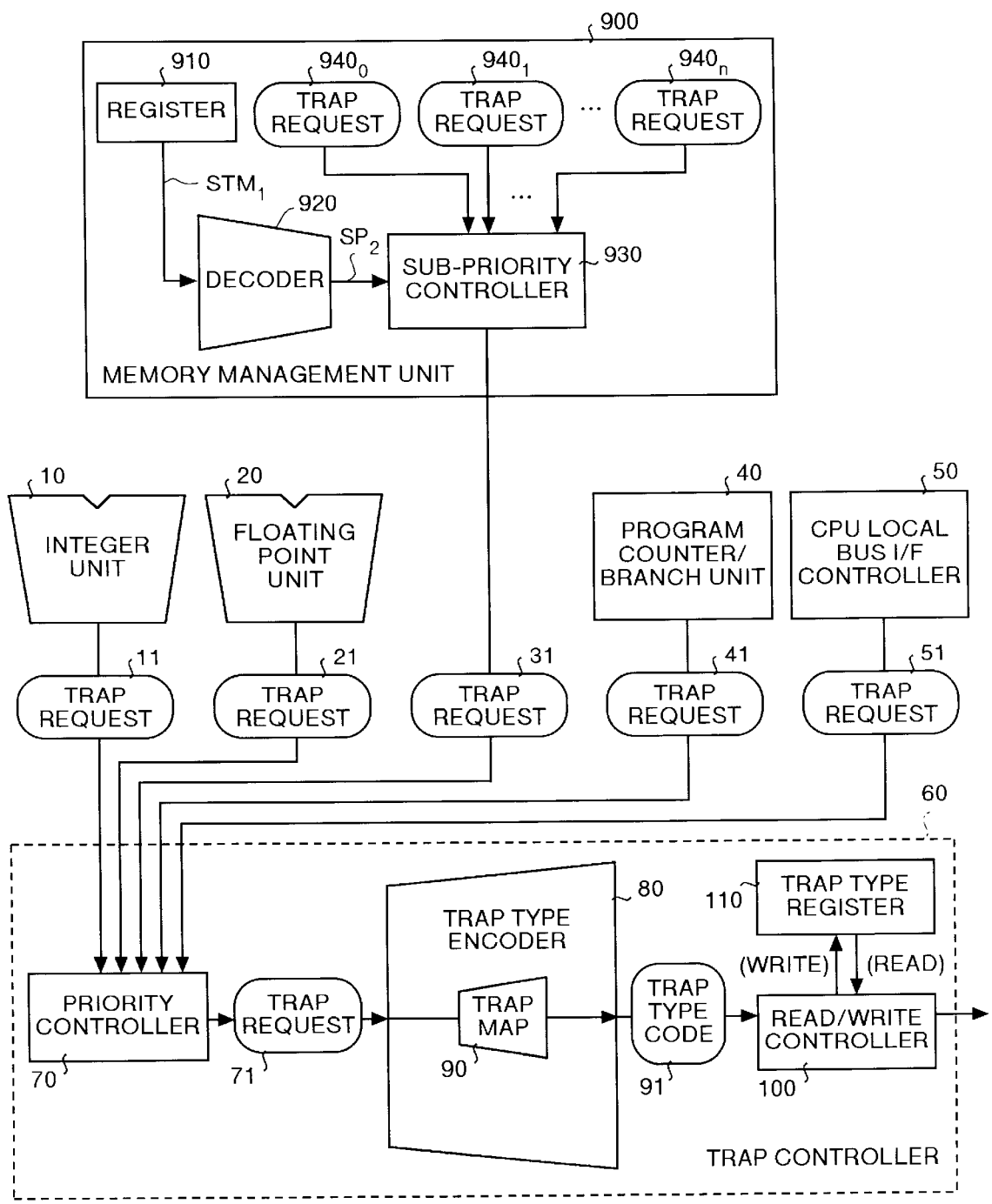
FIG. 10 is a block diagram showing a configuration of an eighth embodiment of the invention.

FIG. 10 is a block diagram showing a configuration of the eighth embodiment of the invention. In the diagram, same components as in parts in FIG. 19 are identified with same reference numerals. Herein, instead of the memory management unit 30 shown in FIG. 19, a memory management unit 900 as execution unit is provided. This memory management unit 900, same as the memory management unit 30 (see FIG. 19), converts mutually between virtual address and physical address, controls accesses to the cache memory (not shown), and issues trap request 31 as required.

The memory management unit 900 comprises a register 910, a decoder 920, and sub-priority controller 930. In the register 910, status data $STM_1$ expressing the status (state) of n! (factorial of n) of the memory management unit 900 is stored. The decoder 920 decodes the status data $STM_1$, and issues it as selection data $SP_2$.

Figure 11:
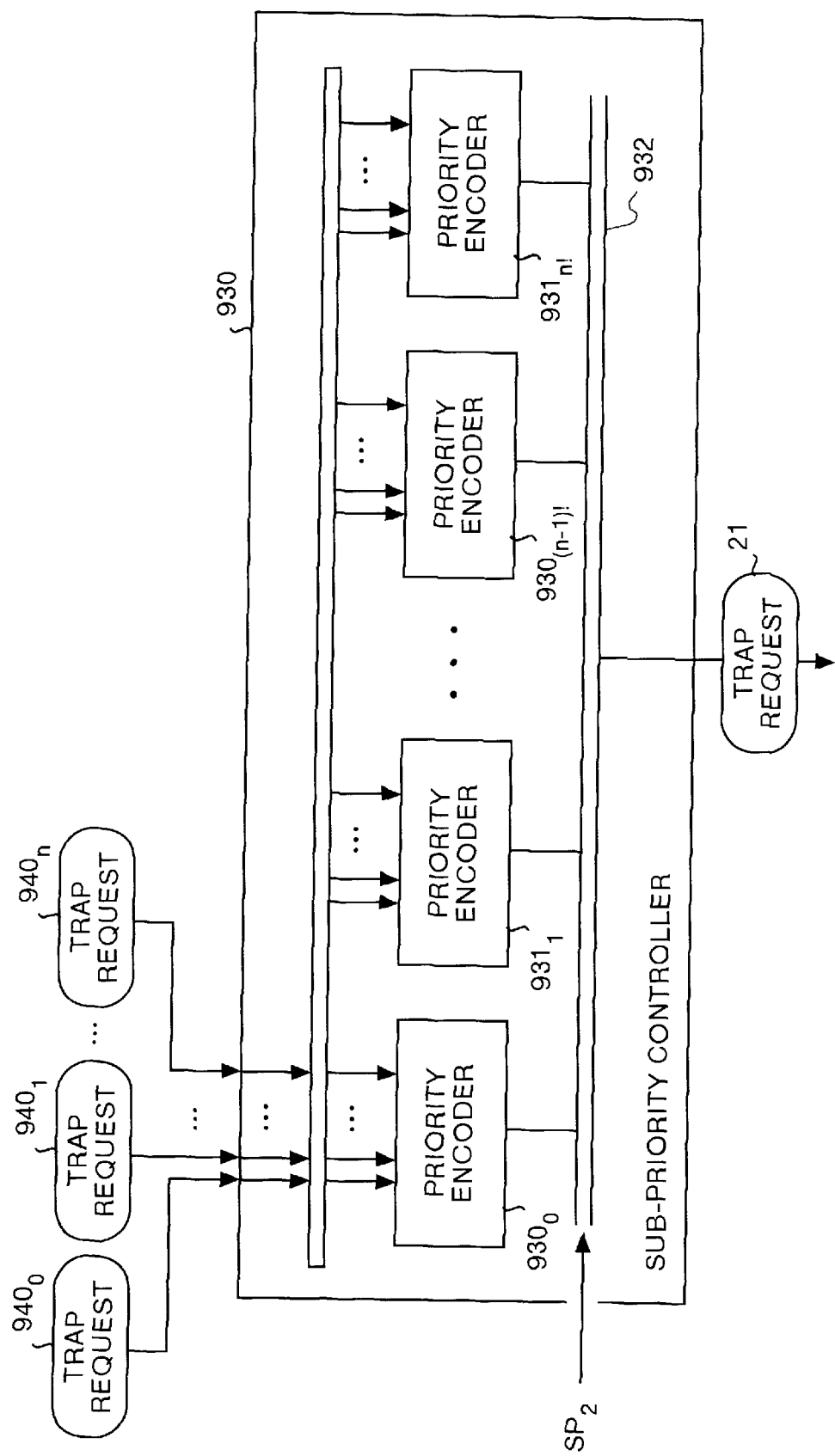
FIG. 11 is a diagram showing a configuration of a sub-priority controller 930 shown in FIG. 10.

This selection data $SP_2$ shown in FIG. 11 is the data for selecting any one of outputs of n! (factorial of n) pieces of priority encoders $931_0$ to $931_{n!}$ corresponding to the status (state) of the register 910 (see FIG. 10), in other words, n types of trap requests $940_0$ to $940_n$ by the multiplexer 932. Each one of the priority encoders $931_0$ to $931_{n!}$ encodes the trap request of high priority when plural trap requests are given at the same time, according to n! types of priority ranks in the trap requests $940_0$ to $940_n$.

The operation of the eighth embodiment will now be explained. In FIG. 10, the memory management unit 900, in the case of a certain status (called first status), stores status data $STM_1$ corresponding to this first status in the register 910. This status data $STM_1$ is decoded by the decoder 920, and is issued to the multiplexer 932 as selection data $SP_2$. As a result, the priority encoder $931_0$ side shown in FIG. 11 is selected in the multiplexer 932.

In this state, when the trap request $940_0$ and trap request $940_1$ are given at the same time, for example, the priority encoder $931_0$ encodes the trap request $940_0$ by priority. In this case, since the priority encoder $931_0$ side is selected by the multiplexer 932, the trap request $940_0$ is issued from the multiplexer 932 to the priority controller 70 shown in FIG. 10 as the trap request 31. Thereafter, by the same operation as mentioned above, the trap request 31 is fed into the trap type encoder 80 as trap request 71, and the trap type code 91 conforming to the trap map 90 is issued from the trap type encoder 80 to the read/write controller 100.

In FIG. 10, when the status of the memory management unit 900 is changed from the first status to the second status, the memory management unit 900 stores the status data $STM_1$ corresponding to the second status in the register 910. This status data $STM_1$ is decoded by the decoder 920, and is issued to the multiplexer 932 as selection data $SP_2$. As a result, the priority encoder $931_1$ side is selected in the multiplexer 932.

In this state, when the trap request $940_0$ and trap request $940_1$ are given at the same time, for example, the priority encoder $931_1$ encodes the trap request $940_1$ by priority. In this case, since the priority encoder $931_1$ side is selected by the multiplexer 932, the trap request $940_1$ is issued from the multiplexer 932 to the priority controller 70 shown in FIG. 10 as the trap request 31. Thereafter, by the same operation as mentioned above, the trap request 31 is fed into the trap type encoder 80 as trap request 71, and the trap type code 91 conforming to the trap map 90 is issued from the trap type encoder 80 to the read/write controller 100.

In the eighth embodiment, the execution unit is the memory management unit 900, but, alternatively, other execution unit than the memory management unit 900 (integer unit 10, floating point unit 20, program counter/branch unit 40, or CPU local bus I/F controller 50) may be provided with the same function as the memory management unit 900, and the trap request may be controlled by priority depending on the status of the execution unit.

In the seventh embodiment, the priority is controlled by the own execution unit (in this case, floating point unit 800), on trap requests as shown in FIG. 8, but it may be also designed to control priority within the own execution unit on the basis of the status of other execution unit than the own execution unit. Such example is explained as a ninth embodiment below.

Figure 12:
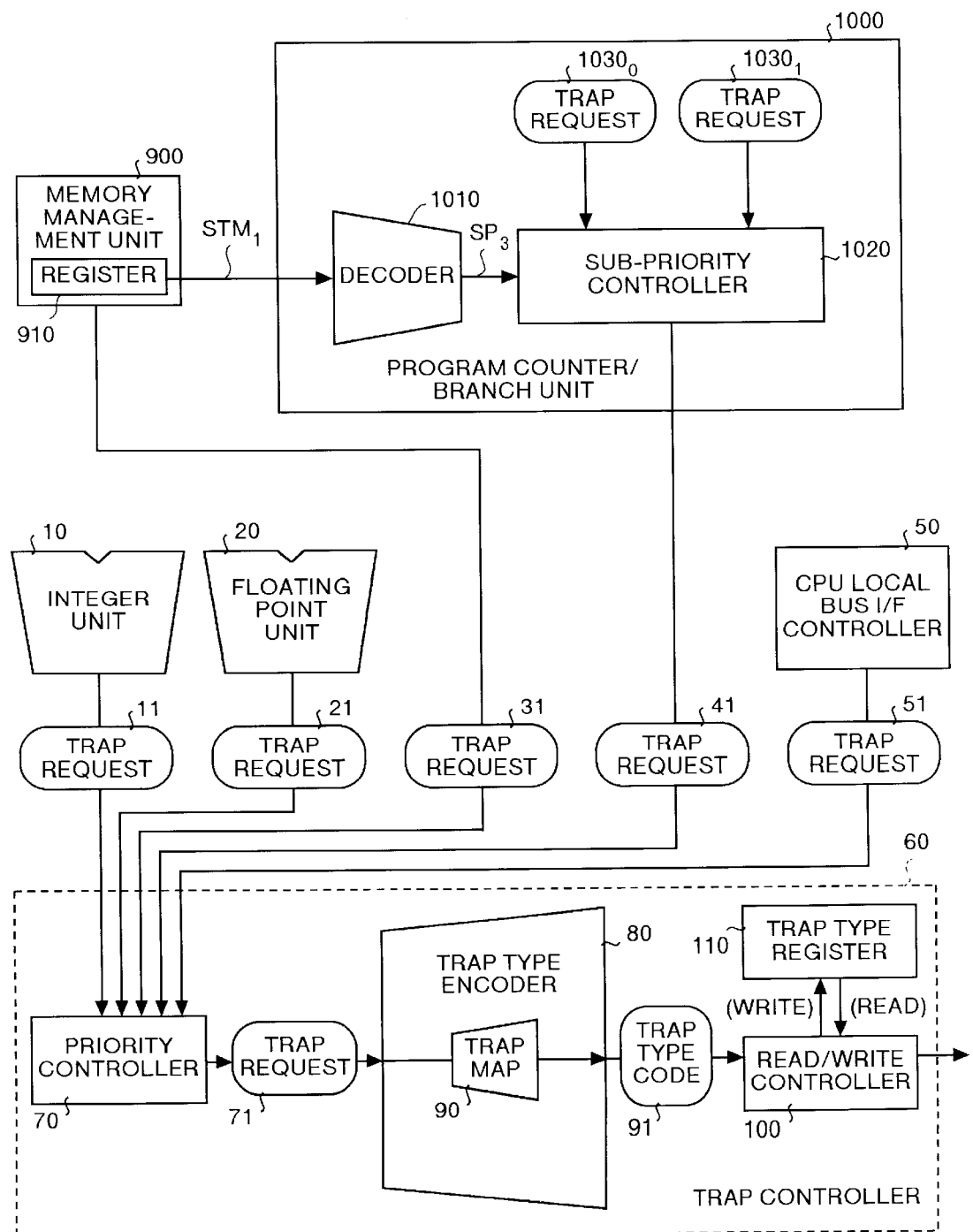
FIG. 12 is a block diagram showing a configuration of a ninth embodiment of the invention.

FIG. 12 is a block diagram showing a configuration of the ninth embodiment of the invention. In the diagram, same components as in parts in FIG. 19 are identified with same reference numerals. Herein, instead of the program counter/branch unit 40 and memory management unit 30 shown in FIG. 19, a program counter/branch unit 1000 as own execution unit and a memory management unit 900 as other execution unit are provided.

The memory management unit 900 converts mutually between virtual address and physical address, controls accesses to the cache memory (not shown), and issues trap request 31 as required. The memory management unit 900 comprises a register 910. In the register 910, status data $STM_1$ expressing the status (state) of the memory management unit 900 is stored. The status includes a status corresponding to normal time of the memory management unit 900 (hereinafter called first status) and a status corresponding to other than normal time (hereinafter called second status).

The program counter/branch unit 1000 counts execution programs, and predicts branch address of program branch instruction, and issues a trap request 41 as required. The program counter/branch unit 1000 comprises a decoder 1010 and a sub-priority controller 1020. The decoder 1010 decodes the status data $STM_1$, and issues it as selection data $SP_3$.

This selection data $SP_3$ is the data for selecting either one of trap request $1030_0$ and trap request $1030_1$, depending on the status of the memory management unit 900, by the sub-priority controller 1020. This sub-priority controller 1020 is composed same as the sub-priority controller 830 (see FIG. 9).

Specifically, when the selection data $SP_3$ (status data $STM_1$) corresponds to the first status, the sub-priority controller 1020 selects the trap request $1030_0$, and issues it to the priority controller 70 as trap request 41. On the other hand, when the selection data $SP_3$ (status data $STM_1$) corresponds to the second status, the sub-priority controller 1020 selects the trap request $1030_1$, and issues it to the priority controller 70 as trap request 41.

The operation of the ninth embodiment will now be explained. In FIG. 12, the memory management unit 900, in the case that the status of the memory management unit 900 (other execution unit) is the first status, stores status data $STM_1$ corresponding to this first status in the register 910. This status data $STM_1$ is decoded by the decoder 1010 of the program counter/branch unit 1000 (own execution unit), and is put into the sub-priority controller 1020 as selection data $SP_3$.

In this state, when the trap request $1030_0$ and trap request $1030_1$ are given at the same time, the sub-priority controller 1020 selects the trap request $1030_0$ by priority according to the selection data $SP_3$, and sends it to the priority controller 70 as trap request 41. Thereafter, by the same operation as mentioned above, the trap request 41 is fed into the trap type encoder 80 as trap request 71, and the trap type code 91 conforming to the trap map 90 is issued from the trap type encoder 80 to the read/write controller 100.

Meanwhile, the memory management unit 900, in the case that the status of the memory management unit 900 (other execution unit) is changed from the first status to the second status, stores status data $STM_1$ corresponding to this second status in the register 910. This status data $STM_1$ is decoded by the decoder 1010 of the program counter/branch unit 1000 (own execution unit), and is put into the sub-priority controller 1020 as selection data $SP_3$.

In this state, when the trap request $1030_0$ and trap request $1030_1$ are given at the same time, the sub-priority controller 1020 selects the trap request $1030_1$ by priority according to the selection data $SP_3$, and sends it to the priority controller 70 as trap request 41. Thereafter, by the same operation as mentioned above, the trap request 41 is fed into the trap type encoder 80 as trap request 71, and the trap type code 91 conforming to the trap map 90 is issued from the trap type encoder 80 to the read/write controller 100.

In the ninth embodiment, the own execution unit is the program counter/branch unit 1000, and the other execution unit is the memory management unit 900, but the functions of the own execution unit and other execution unit may be given to the integer unit 10, floating point unit 20, and CPU local bus I/F controller 50, and the priority of trap requests may be controlled within the own execution unit depending on the status of the other execution unit.

As explained herein, according to the ninth embodiment, since the sub-priority controller 1020 is used for selecting according to the priority corresponding to the state of the memory management unit 900 (other execution unit), from the plural trap requests $1030_0$ and $1030_1$ in the program counter/branch unit 1000 (own execution unit), the priority control on trap requests can be executed finely at the program counter/branch unit 1000 (own execution unit) side.

In the ninth embodiment, as shown in FIG. 12, the priority of two trap requests $840_0$ and $840_1$ is controlled in the own execution unit (in this case, program counter/branch unit 1000), on the basis of the status of other execution unit (in this case, memory management unit 900), but it may be also designed to control priority of n types (three or more) of trap requests within the own execution unit on the basis of the status of other execution unit. Such example is explained as a tenth embodiment below.

Figure 13:
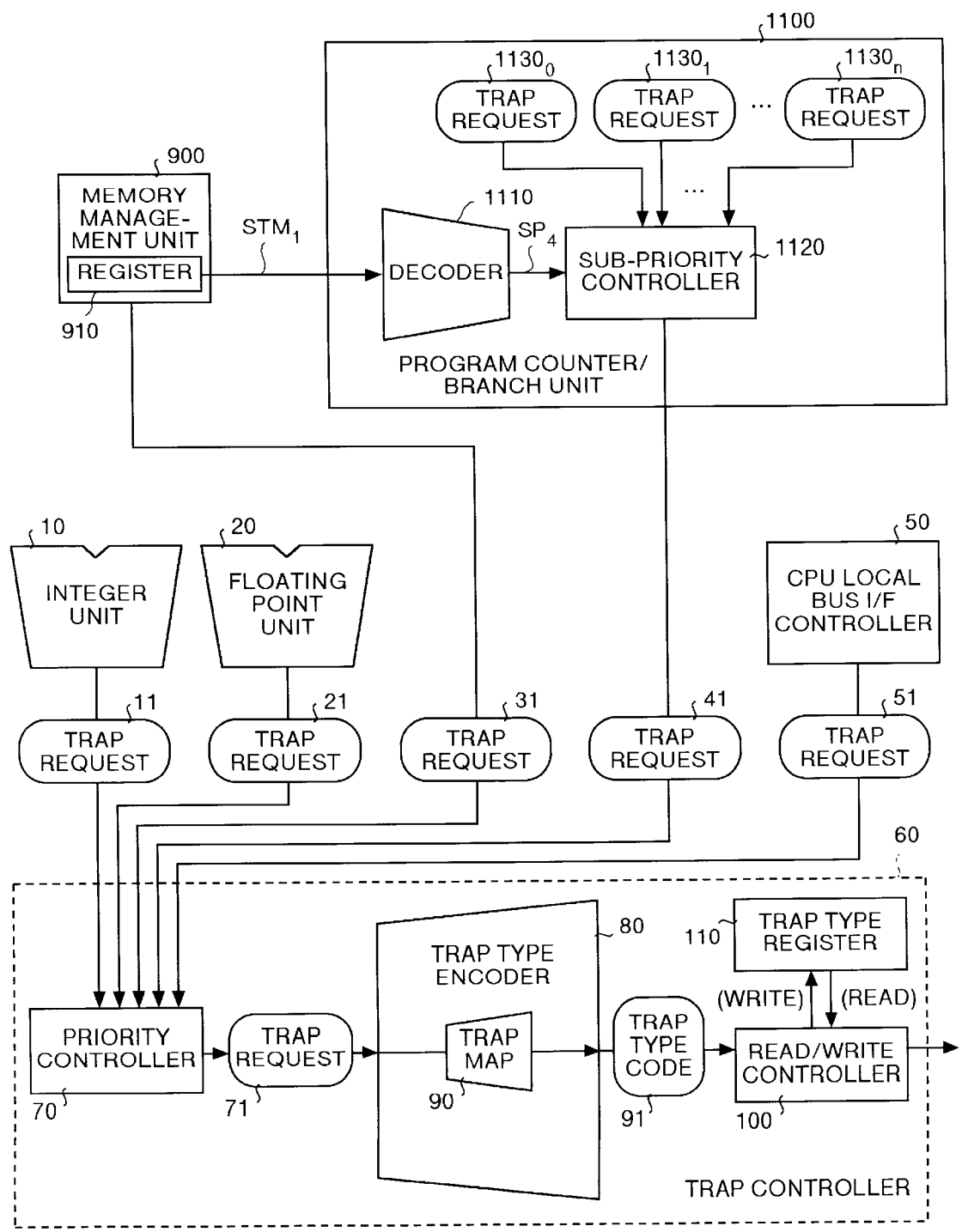
FIG. 13 is a block diagram showing a configuration of a tenth embodiment of the invention.

FIG. 13 is a block diagram showing a configuration of the tenth embodiment of the invention. In the diagram, same components as in parts in FIG. 12 are identified with same reference numerals. Herein, instead of the program counter/branch unit 1000 shown in FIG. 12, a program counter/branch unit 1100 as own execution unit is provided.

In the tenth embodiment, in the register 910 of the memory management unit 900, the status data $STM_1$ expressing plural types (at least three) of the status (state) of the memory management unit 900 is stored. The status includes a first status, a second status, and so forth. The program counter/branch unit 1100 counts execution programs, and predicts branch address of program branch instruction, and issues a trap request 41 as required. The program counter/branch unit 1100 comprises a decoder 1110 and a sub-priority controller 1120. The decoder 1110 decodes the status data $STM_1$, and issues it as selection data $SP_4$.

This selection data $SP_4$ is the data for selecting either one of n types of trap requests $1130_0$, $1130_1$, . . . , $1130_n$, depending on the status of the memory management unit 900, by the sub-priority controller 1120. This sub-priority controller 1120 is composed same as the sub-priority controller 930 (see FIG. 10). For example, when the selection data $SP_4$ (status data $STM_1$) corresponds to the first status, the sub-priority controller 1120 selects the trap request $1130_0$, and issues it to the priority controller 70 as trap request 41.

The operation of the tenth embodiment will now be explained. In FIG. 13, the memory management unit 900, in the case that the status of the memory management unit 900 (other execution unit) is the first status, stores status data $STM_1$ corresponding to this first status in the register 910. This status data $STM_1$ is decoded by the decoder 1110 of the program counter/branch unit 1100 (own execution unit) and is put into the sub-priority controller 1120 as selection data $SP_4$.

In this state, when the trap request $1130_0$ and trap request $1130_1$ are given at the same time, the sub-priority controller 1120 selects the trap request $1130_0$ by priority according to the selection data $SP_4$, and sends it to the priority controller 70 as trap request 41. Thereafter, by the same operation as mentioned above, the trap request 41 is fed into the trap type encoder 80 as trap request 71, and the trap type code 91 conforming to the trap map 90 is issued from the trap type encoder 80 to the read/write controller 100.

Meanwhile, the memory management unit 900, in the case that the status of the memory management unit 900 (other execution unit) is changed from the first status to the second status, stores status data $STM_1$ corresponding to this second status in the register 910. This status data $STM_1$ is decoded by the decoder 1110 of the program counter/branch unit 1100 (own execution unit), and is put into the sub-priority controller 1120 as selection data $SP_4$.

In this state, when the trap request $1130_0$ and trap request $1130_1$ are given at the same time, the sub-priority controller 1120 selects the trap request $1130_1$ by priority according to the selection data $SP_4$, and sends it to the priority controller 70 as trap request 41. Thereafter, by the same operation as mentioned above, the trap request 41 is fed into the trap type encoder 80 as trap request 71, and the trap type code 91 conforming to the trap map 90 is issued from the trap type encoder 80 to the read/write controller 100.

In the tenth embodiment, the own execution unit is the program counter/branch unit 1100, and the other execution unit is the memory management unit 900, but the functions of the own execution unit and other execution unit may be given to the integer unit 10, floating point unit 20, and CPU local bus I/F controller 50, and the priority of trap requests may be controlled within the own execution unit depending on the status of the other execution unit.

In the seventh embodiment, as shown in FIG. 8, the priority of trap requests is controlled on the basis of the own execution unit (in this case, floating point unit 800), but it may be also designed to control priority within the own execution unit on the basis of the status of other execution unit, in addition to the status of the own execution unit. Such example is explained as an eleventh embodiment below.

Figure 14:
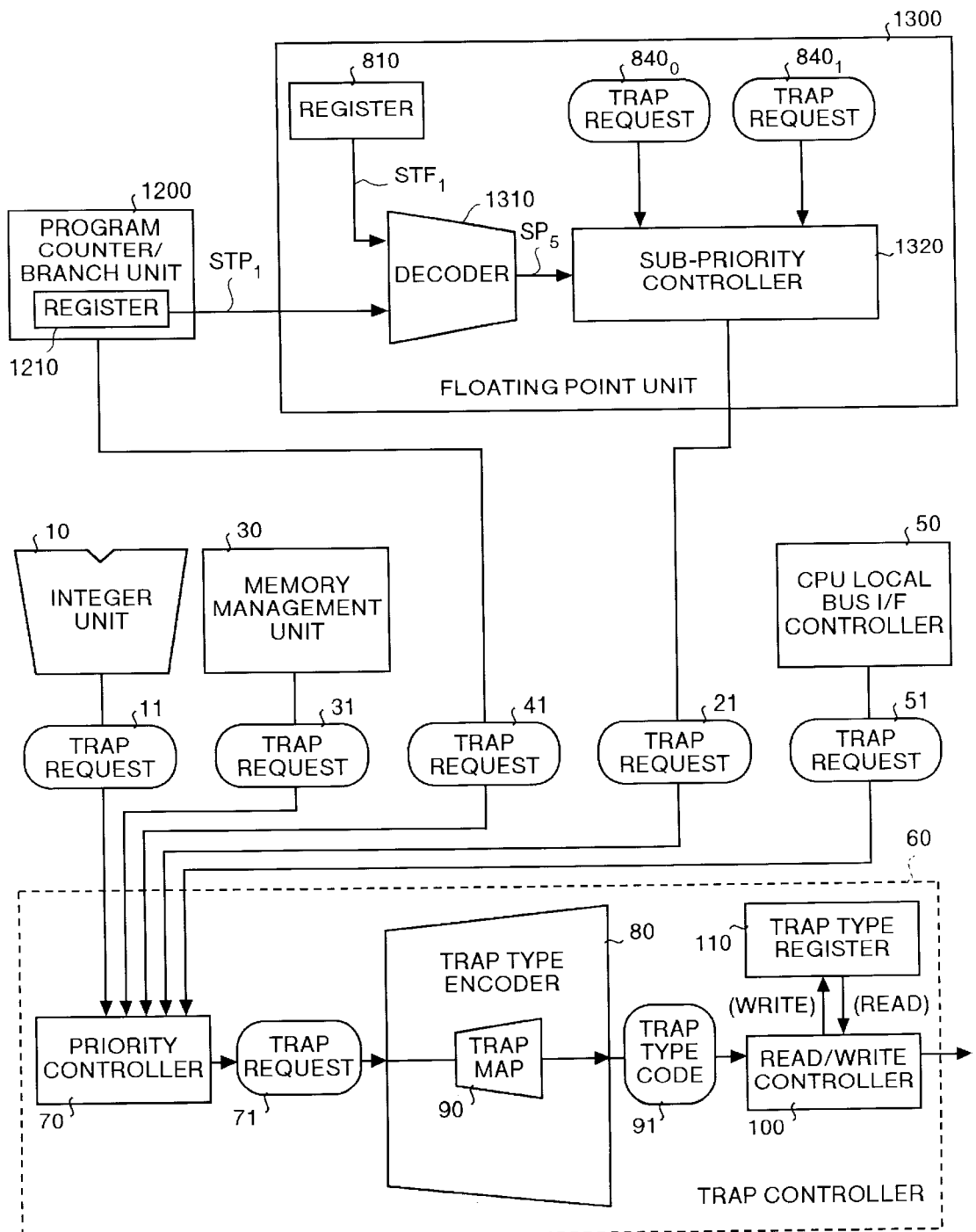
FIG. 14 is a block diagram showing a configuration of an eleventh embodiment of the invention.

FIG. 14 is a block diagram showing a configuration of the eleventh embodiment of the invention. In the diagram, same components as in parts in FIG. 8 are identified with same reference numerals. Herein, instead of the floating point unit 800 and program counter/branch unit 40 shown in FIG. 8, a floating point unit 1300 as own execution unit and a program counter/branch unit 1200 as other execution unit are provided.

Figure 15:
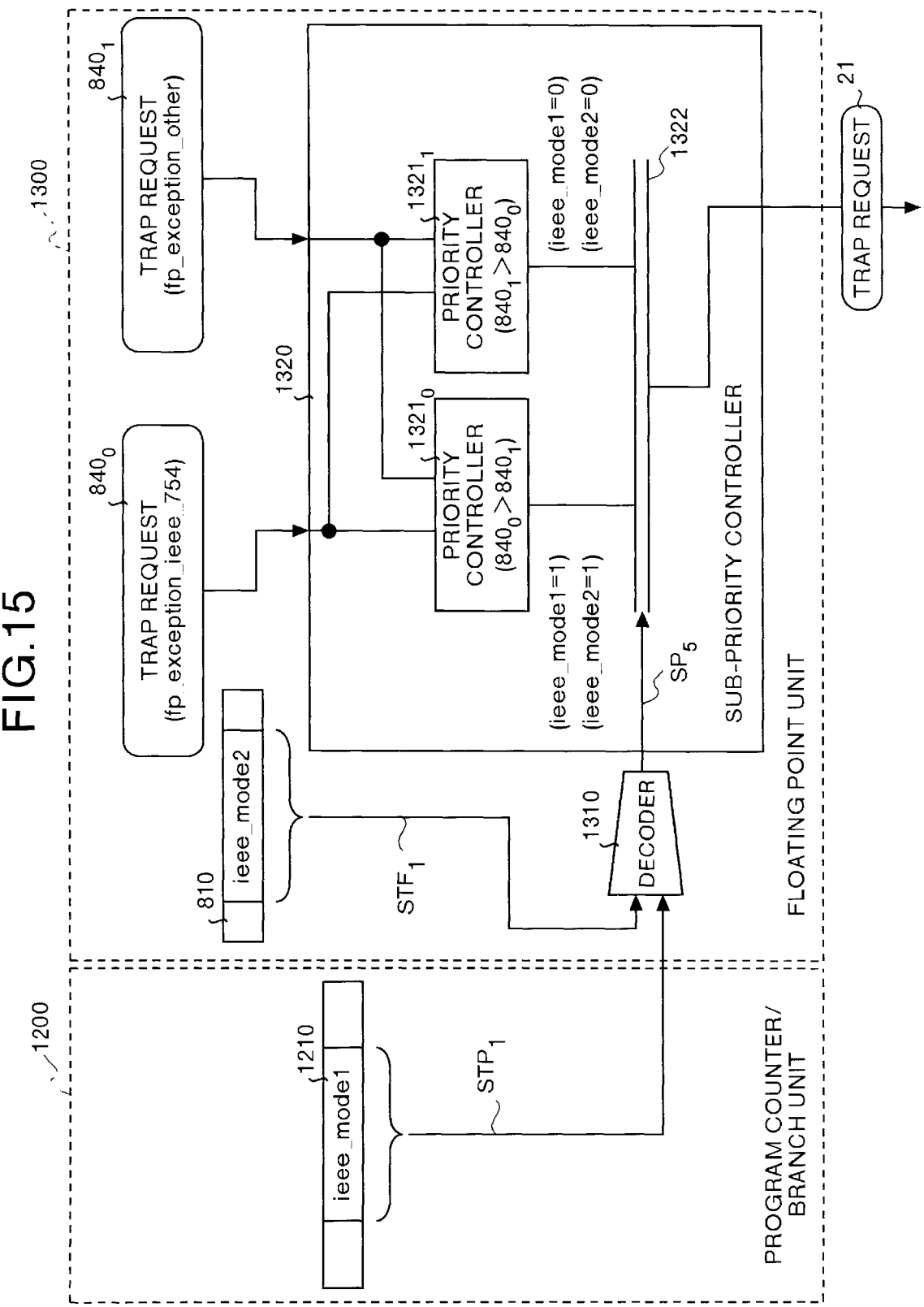
FIG. 15 is a diagram showing a configuration of a register 1210 and a sub-priority controller 1320 shown in FIG. 14.

The program counter/branch unit 1200 counts execution programs, and predicts branch address of program branch instruction, and issues a trap request 41 as required. The program counter/branch unit 1200 comprises a register 1210 as shown in FIG. 15. In the register 1210, status data $STP_1$ expressing the status (state) of the program counter/branch unit 1200 is stored.

For example, when the program counter/branch unit 1200 is in a state for operating in compliance with IEEE754, ieee#mode 1=1 is stored in the register 1210 as status data $STP_1$. On the other hand, when the program counter/branch unit 1200 is in a state for operating other than IEEE754 (e.g. when fp operation is implementation dependent), ieee#mode 1=0 is stored in the register 1210 as status data $STP_1$.

The floating point unit 1300 is an operator for executing floating point operation according to a floating point operation command, and issues trap request 21 as required. This floating point unit 1300 comprises a register 810, a decoder 1310, and sub-priority controller 1320. In the register 810, status data $STF_1$ expressing the status (state) of the floating point unit 1300 is stored. An example of this status is whether the floating point unit 1300 is in a state for operating in compliance with IEEE754 or not.

When the floating point unit 1300 is in a state for operating in compliance with IEEE754, ieee#mode 2=1 is stored in the register 810 as status data $STF_1$. On the other hand, when the floating point unit 1300 is in a state for operating other than IEEE754 (e.g. when fp operation is implementation dependent), ieee#mode 2=0 is stored in the register 810 as status data $STF_1$.

The decoder 1310 decodes the status data $STF_1$ from the register 810 of the floating point unit 1300 as the own execution unit or status data $STP_1$ from the register 1210 of the program counter/branch unit 1200 as the other execution unit, and issues it as selection data $SP_5$.

This selection data $SP_5$ is the data for selecting either one of trap request $840_0$ (fp#exception#ieee#754) and trap request $840_1$ (fp#exception#other) by the multiplexer 1322. Specifically, when the status data $STP_1$ is ieee#mode 1=1 and the status data $STF_1$ is ieee#mode 2=1, the multiplexer 1322 selects the trap request $840_0$ which is the output of the priority encoder $1321_0$, and sends it to the priority controller 70 as the trap request 21 (see FIG. 14).

On the other hand, when the status data $STP_1$ is ieee#mode 1=0 and the status data $STF_1$ is ieee#mode 2=0, the multiplexer 1322 selects the trap request $840_1$ which is the output of the priority encoder $1321_1$, and sends it to the priority controller 70 as the trap request 21 (see FIG. 14). Herein, the trap request $840_0$ conforms to IEEE754, and the trap request $840_1$ does not conform to IEEE754.

The priority encoder $1321_0$, when the trap request $840_0$ and trap request $840_1$ are entered at the same time, encodes the trap request $840_0$ by priority. On the other than, the priority encoder $1321_1$, when the trap request $840_0$ and trap request $840_1$ are entered at the same time, encodes the trap request $840_1$ by priority.

The operation of the eleventh embodiment will now be explained. In FIG. 15, in the case of operation in compliance with IEEE754, the program counter/branch unit 1200 stores ieee#mode 1=1 in the register 1210 as status data $STP_1$. Similarly, in the case of operation conforming to IEEE754, the floating point unit 1300 stores ieee#mode 2=1 in the register 810 as status data $STF_1$.

The status data $STP_1$ and status data $STF_1$ are decoded by the decoder 1310, and issued to the multiplexer 1322 as selection data $SP_5$. As a result, the priority encoder $1321_0$ side is selected in the multiplexer 1322.

In this state, when the trap request $840_0$ and trap request $840_1$ are given at the same time, the priority encoder $1321_0$ encodes the trap request $840_0$ by priority. On the other hand, the priority encoder $1321_1$ encodes the trap request $840_1$ by priority.

In this case, since the priority encoder $1321_0$ side is selected by the multiplexer 1322, the trap request $840_0$ is issued from the multiplexer 1322 to the priority controller 70 shown in FIG. 14 as the trap request 21. Thereafter, by the same operation as mentioned above, the trap request 21 is fed into the trap type encoder 80 as trap request 71, and the trap type code 91 conforming to the trap map 90 is issued from the trap type encoder 80 to the read/write controller 100.

In FIG. 15, in the case of operation other than IEEE754 (e.g. when fp operation is implementation dependent), the program counter/branch unit 1200 stores ieee#mode 1=0 in the register 1210 as status data $STP_1$. Similarly, in the case of operation other than IEEE754 (e.g. when fp operation is implementation dependent), the floating point unit 1300 stores ieee#mode 2=0 in the register 810 as status data $STF_1$.

The status data $STP_1$ and status data $STF_1$ are decoded by the decoder 1310, and issued to the multiplexer 1322 as selection data $SP_5$. As a result, the priority encoder $1321_1$ side is selected in the multiplexer 1322.

In this state, when the trap request $840_0$ and trap request $840_1$ are given at the same time, the priority encoder $1321_0$ encodes the trap request $840_0$ by priority. On the other hand, the priority encoder $1321_1$ encodes the trap request $840_1$ by priority.

In this case, since the priority encoder $1321_1$ side is selected by the multiplexer 1322, the trap request $840_1$ is issued from the multiplexer 1322 to the priority controller 70 shown in FIG. 14 as the trap request 21. Thereafter, by the same operation as mentioned above, the trap request 21 is fed into the trap type encoder 80 as trap request 71, and the trap type code 91 conforming to the trap map 90 is issued from the trap type encoder 80 to the read/write controller 100.

In the eleventh embodiment, as shown in FIG. 14, the own execution unit is the floating point unit 1300, and the other execution unit is the program counter/branch unit 1200, but the functions of the own execution unit and other execution unit may be provided in the integer unit 10, memory management unit 30, CPU local bus I/F controller 50 and others, and it may be designed to control the priority of trap requests in the own execution unit depending on the status of the own execution unit and the status of other execution unit.

As explained herein, according to the eleventh embodiment, since the sub-priority controller 1320 is used for selecting according to the priority corresponding to the state of the program counter/branch unit 1200 (other execution unit), and the state of the floating point unit 1300 (own execution unit), from the plural trap requests $840_0$ and $840_1$ in the floating point unit 1300 (own execution unit), the priority control on trap requests can be executed finely at the floating point unit 1300 (own execution unit) side.

In the eleventh embodiment, the priority of two trap requests $840_0$ and $840_1$ is controlled by the floating point unit 1300 (own execution unit) shown in FIG. 14, but it may be also designed to control priority of n types (three or more) of trap requests. Such example is explained as a twelfth embodiment below.

Figure 16:
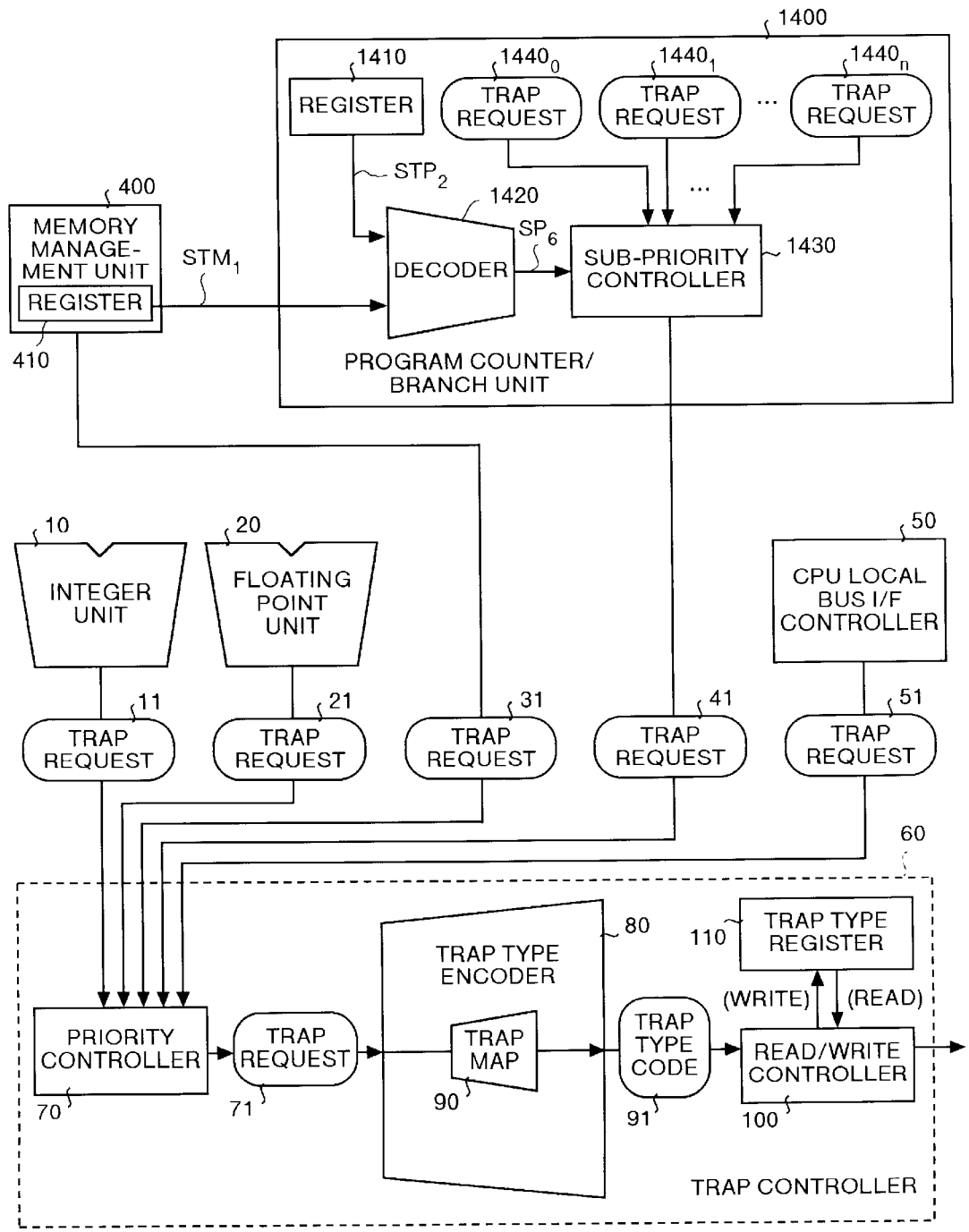
FIG. 16 is a block diagram showing a configuration of a twelfth embodiment of the invention.

FIG. 16 is a block diagram showing a configuration of the twelfth embodiment of the invention. In the diagram, same components as in parts in FIG. 19 are identified with same reference numerals. Herein, instead of the program counter/branch unit 40 shown in FIG. 19, a program counter/branch unit 1400 as other execution unit is provided. Further, herein, instead of the memory management unit 30 shown in FIG. 19, a memory management unit 400 as other execution unit is provided.

This memory management unit 400, same as the memory management unit 30 (see FIG. 19), mutually converts between the virtual address and physical address, and controls access to the cache memory (not shown), and issues a trap request 31 as required. In the register 410 of this memory management unit 400, status data $STM_1$ expressing plural (three or more) types of status (state) of the memory management unit 400 is stored. There are plural types of status.

The program counter/branch unit 1400 counts execution programs, and predicts branch address of program branch instruction, and issues a trap request 41 as required. The program counter/branch unit 1400 comprises a register 1410, a decoder 1420, and a sub-priority controller 1430. In the register 1410, status data $STP_2$ expressing plural (three or more) types of status (state) of the program counter/branch unit 1400 is stored. There are plural types of status.

The decoder 1420 decodes the status data $STM_1$ and status data $STP_2$, and issues them as selection data $SP_6$. This selection data $SP_6$ is the data for selecting one of n types of trap requests $1440_0$, $1440_1$, ..., $1440_n$ in the sub-priority controller 1430, depending on the combination of the status of the memory management unit 400 and status of program counter/branch unit 1400 (for example, first combination, second combination, etc.).

The sub-priority controller 1430 is composed same as the sub-priority controller 930 mentioned above (see FIG. 10). For example, when the selection data $SP_6$ (status data $STM_1$) corresponds to the first combination, the sub-priority controller 1430 selects the trap request $1440_0$, and sends it to the priority controller 70 as trap request 41.

The operation of the twelfth embodiment will now be explained. In FIG. 16, the memory management unit 400 (other execution unit) stores status data $STM_1$ corresponding to the present status in the register 410. Similarly, the program counter/branch unit 1400 (own execution unit) stores the status data $STP_2$ corresponding to the present status in the register 1410. The status data $STM_1$ and status data $STP_2$ are decoded by the decoder 1420 of the program counter/branch unit 1400 (own execution unit), and put into the sub-priority controller 1430 as selection data $SP_6$.

In this state, when the trap request $1440_0$ and trap request $1440_1$ are given at the same time, the sub-priority controller 1430 selects the trap request $1440_0$ by priority according to the selection data $SP_6$, and sends it to the priority controller 70 as trap request 41. Thereafter, by the same operation as mentioned above, the trap request 41 is fed into the trap type encoder 80 as trap request 71, and the trap type code 91 conforming to the trap map 90 is issued from the trap type encoder 80 to the read/write controller 100.

Meanwhile, the memory management unit 400, in the case that the status of the memory management unit 400 (other execution unit) is changed to other status, stores status data $STM_1$ corresponding to this other status in the register 410. Similarly, the program counter/branch unit 1400, in the case that the status of the program counter/branch unit 1400 (own execution unit) is changed to other status, stores the status data $STP_2$ corresponding to this other status in the register 1410.

The status data $STM_1$ and status data $STP_2$ are decoded by the decoder 1420 of the program counter/branch unit 1400 (own execution unit), and put into the sub-priority controller 1430 as selection data $SP_6$.

In this state, when the trap request $1440_0$ and trap request $1440_1$ are given at the same time, the sub-priority controller 1430 selects the trap request $1440_1$ by priority according to the selection data $SP_6$, and sends it to the priority controller 70 as trap request 41. Thereafter, by the same operation as mentioned above, the trap request 41 is fed into the trap type encoder 80 as trap request 71, and the trap type code 91 conforming to the trap map 90 is issued from the trap type encoder 80 to the read/write controller 100.

In the twelfth embodiment, the own execution unit is the program counter/branch unit 1400, and the other execution unit is the memory management unit 400, but the functions of the own execution unit and other execution unit may be given to the integer unit 10, floating point unit 20, and CPU local bus I/F controller 50, and the priority of trap requests may be controlled within the own execution unit depending on the status of the other execution unit and the status of the own execution unit.

In the eleventh embodiment, as the status of the other execution unit shown in FIG. 14, the status of one program counter/branch unit 1200 is used, but the status of plural other execution units may be also sued. Such example is explained as a thirteenth embodiment below.

Figure 17:
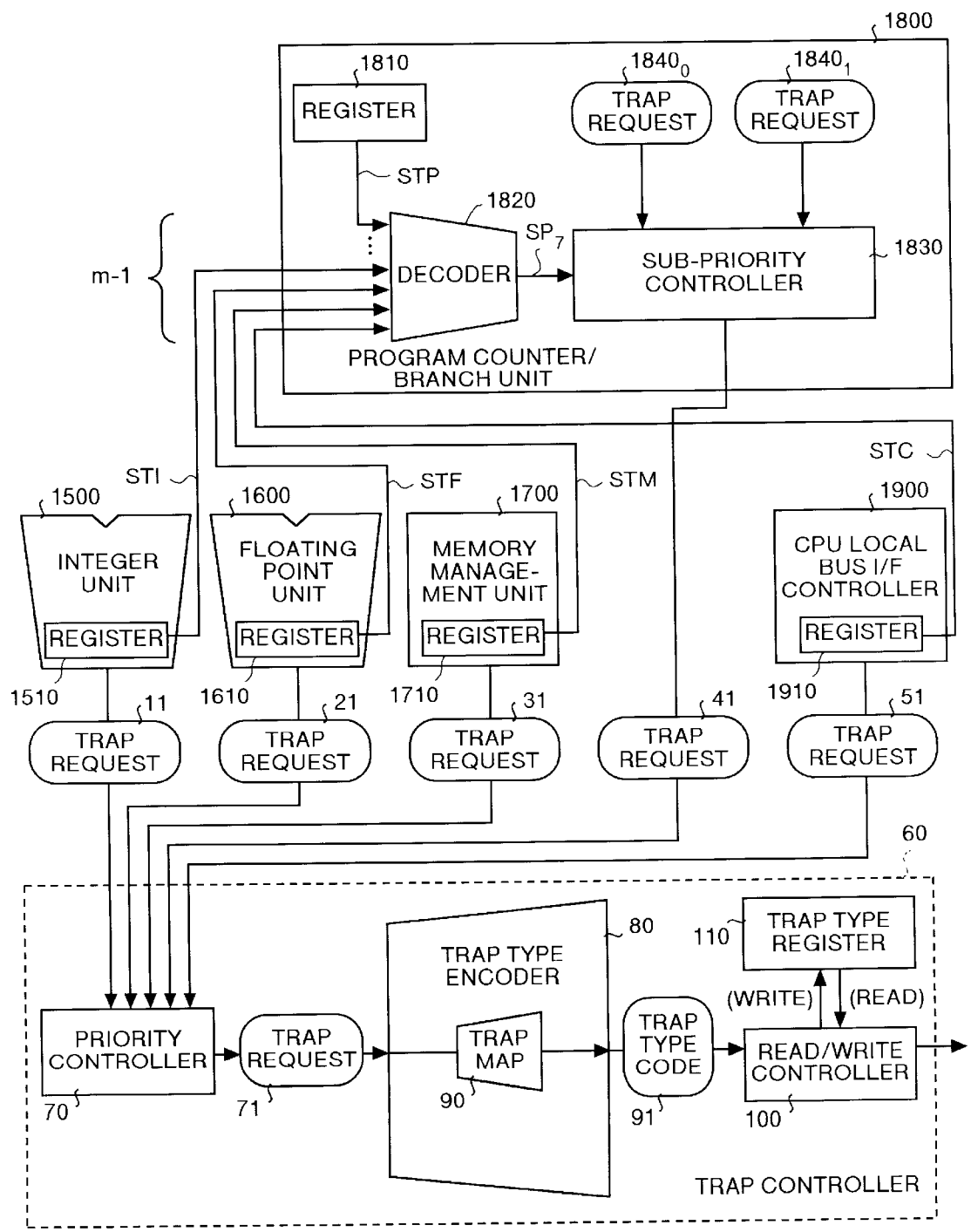
FIG. 17 is a block diagram showing a configuration of a thirteenth embodiment of the invention.

FIG. 17 is a block diagram showing a configuration of the thirteenth embodiment of the invention. In the diagram, same components as in parts in FIG. 19 are identified with same reference numerals. Herein, instead of the integer unit 10, floating point unit 20, memory management unit 30, program counter/branch unit 40, and CPU local bus I/F controller 50 shown in FIG. 19, an integer unit 1500, a floating point unit 1600, a memory management unit 1700, a program counter/branch unit 1800, and a CPU local bus I/F controller 1900 are provided.

In the thirteenth embodiment, the program counter/branch unit 1800 functions as own execution unit, and all others, that is, the integer unit 1500, floating point unit 1600, memory management unit 1700, and CPU local bus I/F controller 1900, function as other execution units.

The basic functions of the integer unit 1500, floating point unit 1600, memory management unit 1700, program counter/branch unit 1800, and CPU local bus I/F controller 1900 are same as those of the integer unit 10, floating point unit 20, memory management unit 30, program counter/branch unit 40, and CPU local bus I/F controller 50.

Therefore, from the integer unit 1500, floating point unit 1600, memory management unit 1700, program counter/branch unit 1800, and CPU local bus I/F controller 1900, as required, trap request 11, trap request 21, trap request 31, trap request 41, and trap request 51 are issued.

However, the integer unit 1500 has a register 1510. In this register 1510, status data STI expressing the status (state) of the integer unit 1500 is stored. The floating point unit 1600 has a register 1610. In this register 1610, status data STF expressing the status (state) of the floating point unit 1600 is stored. The memory management unit 1700 has a register 1710. In this register 1710, status data STM expressing the status (state) of the memory management unit 1700 is stored.

The CPU local bus I/F controller 1900 has a register 1910. In this register 1910, status data STC expressing the status (state) of the CPU local bus I/F controller 1900 is stored. The program counter/branch unit 1800 has a register 1810, a decoder 1820, and a sub-priority controller 1830. In this register 1810, status data STP expressing the status (state) of the program counter/branch unit 1800 is stored.

The decoder 1820 decodes the status data STI, status data STF, status data STM, status data STC, and status data STP, and issues them as selection data $SP_7$. This selection data $SP_7$ is the data for selecting one of trap requests $1840_0$ and $1840_1$ in the sub-priority controller 1830, depending on the combination of the status data STI, . . . , and status data STP mentioned above (for example, first combination, second combination, etc.).

The sub-priority controller 1830 is composed same as the sub-priority controller 830 mentioned above (see FIG. 9). For example, when the selection data $SP_7$ corresponds to the first combination, the sub-priority controller 1830 selects the trap request $1840_0$, and sends it to the priority controller 70 as trap request 41. On the other hand, when the selection data $SP_7$ corresponds to the second combination, the sub-priority controller 1830 selects the trap request $1840_1$, and sends it to the priority controller 70 as trap request 41.

The operation of the thirteenth embodiment will now be explained. In FIG. 17, the other execution units, that is, the integer unit 1500, floating point unit 1600, memory management unit 1700, and CPU local bus I/F controller 1900 store status data STI, status data STF, status data STM, and status data STC corresponding to the present status respectively into the register 1510, register 1610, register 1710, and register 1910. Similarly, the program counter/branch unit 1800 (own execution unit) stores the status data STP corresponding to the present status in the register 1810.

The status data STI, status data STF, status data STM, status data STC, and status data STP are decodedbythe decoder 1820 of the program counter/branch unit 1800 (own execution unit), and put into the sub-priority controller 1830 as selection data $SP_7$. In this case, the combination of the status data is supposed to be the first combination.

In this state, when the trap request $1840_0$ and trap request $1840_1$ are given at the same time, the sub-priority controller 1830 selects the trap request $1840_0$ by priority according to the selection data $SP_7$, and sends it to the priority controller 70 as trap request 41. Thereafter, by the same operation as mentioned above, the trap request 41 is fed into the trap type encoder 80 as trap request 71, and the trap type code 91 conforming to the trap map 90 is issued from the trap type encoder 80 to the read/write controller 100.

Meanwhile, when the status of the integer unit 1500, floating point unit 1600, memory management unit 1700, program counter/branch unit 1800, and CPU local bus I/F controller 1900 is changed to other status, the other status is stored in each register.

The other status data STI, . . . , STC, STP are decoded by the decoder 1820 of the program counter/branch unit 1800 (own execution unit), and put into the sub-priority controller 1830 as selection data $SP_7$. In this case, the combination of the status data is supposed to be the second combination.

In this state, when the trap request $1840_0$ and trap request $1840_1$ are given at the same time, the sub-priority controller 1830 selects the trap request $1840_1$ by priority according to the selection data $SP_7$, and sends it to the priority controller 70 as trap request 41. Thereafter, by the same operation as mentioned above, the trap request 41 is fed into the trap type encoder 80 as trap request 71, and the trap type code 91 conforming to the trap map 90 is issued from the trap type encoder 80 to the read/write controller 100.

In the thirteenth embodiment, the own execution unit is the program counter/branch unit 1800, but the function of the program counter/branch unit 1800 may be also provided in the integer unit 1500, floating point unit 1600, memory management unit 1700, or CPU local bus I/F controller 1900.

In the thirteenth embodiment, the priority of two trap requests $1840_0$ and $1840_1$ is controlled by the program counter/branch unit 1800 (own execution unit) shown in FIG. 17, but it may be also designed to control priority of n types (three or more) of trap requests. Such example is explained as a fourteenth embodiment below.

Figure 18:
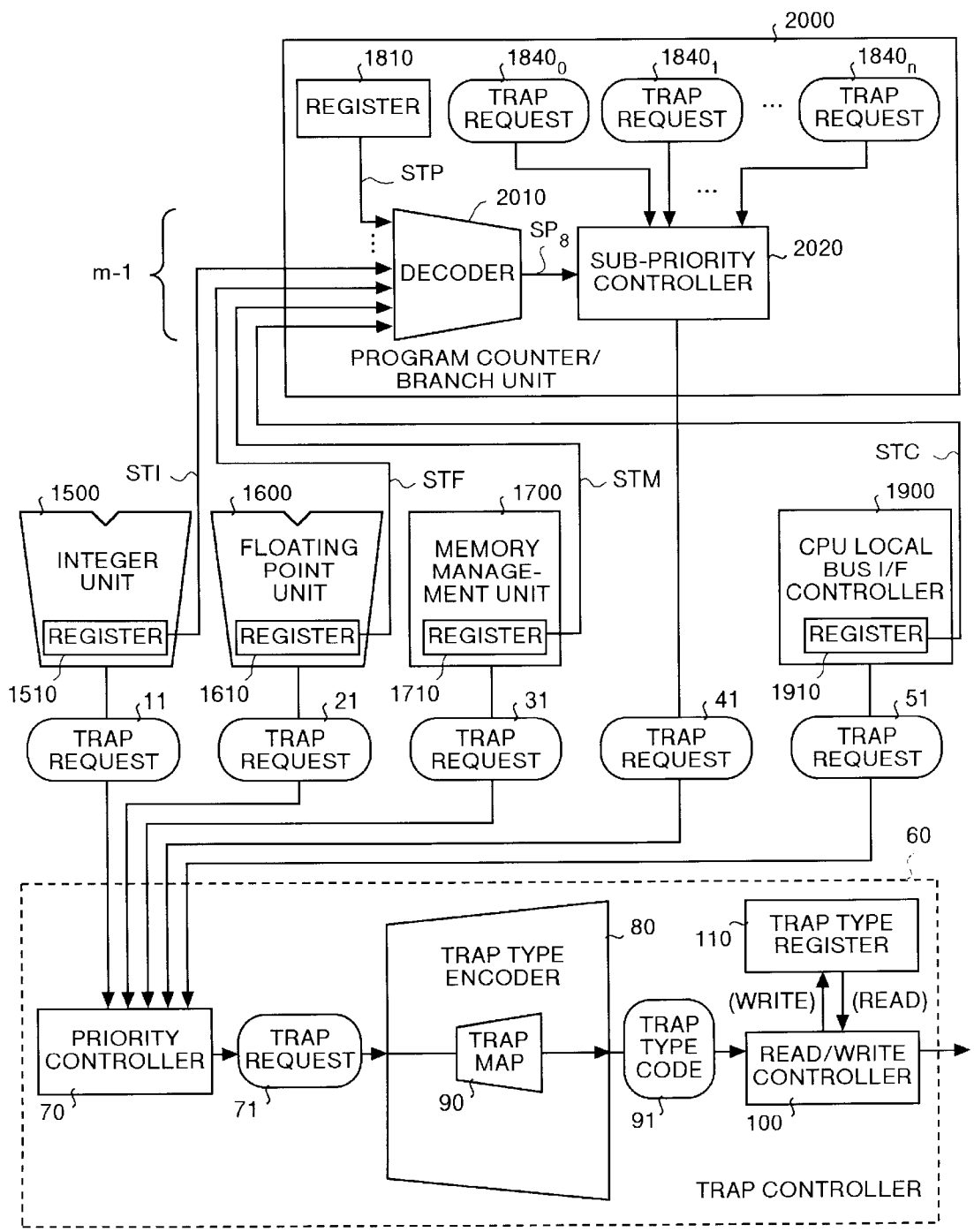
FIG. 18 is a block diagram showing a configuration of a fourteenth embodiment of the invention.

FIG. 18 is a block diagram showing a configuration of the fourteenth embodiment of the invention. In the diagram, same components as in parts in FIG. 17 are identified with same reference numerals. Herein, instead of the program counter/branch unit 1800 shown in FIG. 17, a program counter/branch unit 2000 as own execution unit is provided.

The program counter/branch unit 2000 counts execution programs, and predicts branch address of program branch instruction, and issues a trap request 41 as required. The program counter/branch unit 2000 comprises a register 1810 (see FIG. 17), a decoder 2010, and a sub-priority controller 2020.

The decoder 2010 decodes the status data STI, status data STF, status data STM, status data STC, and status data STP, and issues them as selection data $SP_8$. This selection data $SP_8$ is the data for selecting one of n types of trap requests $1840_0, 1840_1, \ldots, 1840_n$ in the sub-priority controller 2020, depending on the combination of the status data STI, . . . , and status data STP (for example, first combination, second combination, etc.).

The sub-priority controller 2020 is composed same as the sub-priority controller 930 mentioned above (see FIG. 10). For example, when the selection data $SP_8$ corresponds to the first combination, the sub-priority controller 2020 selects the trap request $1840_0$, and sends it to the priority controller 70 as trap request 41.

The operation of the fourteenth embodiment will now be explained. In FIG. 18, the other execution units, that is, the integer unit 1500, floating point unit 1600, memory management unit 1700, and CPU local bus I/F controller 1900 store status data STI, status data STF, status data STM, and status data STC corresponding to the present status respectively into the register 1510, register 1610, register 1710, and register 1910 same as in the case of the thirteenth embodiment. Similarly, the program counter/branch unit 2000 (own execution unit) stores the status data STP corresponding to the present status in the register 1810.

The status data STI, status data STF, status data STM, status data STC, and status data STP are decoded by the decoder 2010 of the program counter/branch unit 2000 (own execution unit), and put into the sub-priority controller 2020 as selection data $SP_8$. In this case, the combination of the status data is supposed to be the first combination.

In this state, when the trap request $1840_0$ and trap request $1840_1$ are given at the same time, the sub-priority controller 2020 selects the trap request $1840_0$ by priority according to the selection data $SP_8$, and sends it to the priority controller 70 as trap request 41. Thereafter, by the same operation as mentioned above, the trap request 41 is fed into the trap type encoder 80 as trap request 71, and the trap type code 91 conforming to the trap map 90 is issued from the trap type encoder 80 to the read/write controller 100.

Meanwhile, when the status of the integer unit 1500, floating point unit 1600, memory management unit 1700, program counter/branch unit 2000, and CPU local bus I/F controller 1900 is changed to other status, the other status is stored in each register same as in the case of the thirteenth embodiment.

The other status data STI, . . . , STC, and STP are decoded by the decoder 2010 of the program counter/branch unit 2000 (own execution unit), and put into the sub-priority controller 2020 as selection data $SP_8$. In this case, the combination of the status data is supposed to be the second combination.

In this state, when the trap request $1840_0$ and trap request $1840_1$ are given at the same time, the sub-priority controller 2020 selects the trap request $1840_1$ by priority according to the selection data $SP_8$, and sends it to the priority controller 70 as trap request 41. Thereafter, by the same operation as mentioned above, the trap request 41 is fed into the trap type encoder 80 as trap request 71, and the trap type code 91 conforming to the trap map 90 is issued from the trap type encoder 80 to the read/write controller 100.

In the fourteenth embodiment, the own execution unit is the program counter/branch unit 2000, but the function of the program counter/branch unit 2000 may be also provided in the integer unit 1500, floating point unit 1600, memory management unit 1700, or CPU local bus I/F controller 1900.

The first to fourteenth embodiments of the invention are described above in detail by referring to the accompanying drawings, but specific examples are not limited to the first to fourteenth embodiments alone, but changes and modifications of design not departing from the true spirit of the invention are all included in the scope of the invention.

As described herein, according to the present invention, the encoding unit has the first trap map and second trap map corresponding to the first system and second system respectively, and the trap map can be changed depending on the system, so that the operation processing apparatus can be applied easily and inexpensively in plural systems.

Further, the encoding unit has the first trap map and second trap map conforming to the first state and second state of the execution unit, and the trap map can be changed depending on the state of the execution unit, and therefore a fine trap request control is possible depending on the state of the execution unit.

Further, since the priority control unit selects on the basis of the priority corresponding to the state of the execution unit among plural trap requests in the execution unit, the priority control can be finely executed corresponding to the trap request at the execution unit side.

Further, since the priority control unit selects on the basis of the priority corresponding to the state of the first execution unit among plural trap requests in the second execution unit, the priority control can be finely executed corresponding to the trap request at the second execution unit side.

Further, since the priority control unit selects on the basis of the priority corresponding to the state of the first execution unit and the state of the second execution unit among plural trap requests in the second execution unit, the priority control can be finely executed corresponding to the trap request at the second execution unit side.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An operation processing apparatus which executes trap processing to issue a trap type code corresponding to a trap request issued from an execution unit which is connected to the operation processing apparatus, said operation processing apparatus comprising:

a selecting unit which selects one system, out of at least a first operating system and a second operating system, for applying the operation processing apparatus thereto; and an encoding unit connected to the selecting unit, which receives the trap reguest from the execution unit and encodes the trap request into a first trap type code or a second trap type code, based on the system selected by the selecting unit, where the first trap code comes from a first trap map defining a corresponding relation of the trap request and the first trap type code conforming to the first operating system, and where the second trap codes comes from a second trap map defining a corresponding relation of the trap request and the second trap type code conforming to the second operating system.

2. The operation processing apparatus according to claim 1, wherein said selecting unit selects one system, out of three or more operating systems, in which said operation processing apparatus is to be applied, and said encoding unit encodes the trap request from said execution unit, according to the system selected by said selecting unit, from three or more types of trap type code corresponding to said three or more operating systems.

3. The operation processing apparatus according to claim 1, wherein said selecting unit includes a storing unit which stores the selection data, and a decoding unit which decodes the selection data stored in said storing unit.

4. The operation processing apparatus according to claim 1, wherein said selecting unit includes a storing unit which stores the selection data determined by an external mechanism, and a decoding unit which decodes the selection data stored in said storing unit.

5. An operation processing apparatus which executes trap processing to issue a trap type code corresponding to a trap request issued from an execution unit which is connected to the operation processing apparatus, said operation processing apparatus comprising:

an encoding unit which receives the trap request from the execution unit and encodes the trap request into first trap type code or second trap type code, according to either one corresponding to the state of said execution unit, from a first trap map conforming to a first operating system and defining the corresponding relation of the trap request and first trap type code conforming to a first state of said execution unit, and a second trap map conforming to a second operating system and defining the corresponding relation of the trap request and second trap type code conforming to a second state of said execution unit.

6. An operation processing apparatus which executes trap processing to issue a trap type code corresponding to a trap request issued from an execution unit which is connected to the operation processing apparatus, having a plurality of trap maps conforming to a plurality of status of execution units and defining a corresponding relation of the trap request and a trap type code corresponding to the state of said execution unit, which comprises an encoding unit receiving the trap request from the execution unit and encoding the trap request into a trap type code, according to one of the plurality of trap maps corresponding to the state of said execution unit.

7. An operation processing apparatus according to claim 5, further comprising:

a plurality of other execution units which are connected to the operation processing apparatus;

a status register disposed in the execution unit, which stores status data expressing the state of the execution unit; and a priority control unit which receives trap reguests from the execution unit and the other execution units and selects one trap reguest among the trap requests, on the basis of the priority determined by the status data, in a case where a plurality of the trap requests are issued simultaneously in said execution unit and the other executing units.

8. The operation processing apparatus according to claim 7, wherein said priority control unit selects the trap request of the highest priority, among three or more trap requests, on the basis of the priority determined by the status data, when three or more trap requests are given at the same time.

9. An operation processing apparatus comprising:

a first execution unit;

a status register disposed in the first execution unit, which stores status data expressing a state of the first execution unit;

a second execution unit which receives the status data from the first execution unit: and a priority control unit disposed in the second execution unit, which selects a trap request, on the basis of a priority determined by the status data, in a case where a plurality of trap requests are issued simultaneously in the second execution unit.

10. The operation processing apparatus according to claim 9, wherein said priority control unit selects the trap request of the highest priority, among three or more trap requests, on the basis of the priority determined by the status data, when three or more trap requests are given in said second execution unit at the same time.

11. An operation processing apparatus comprising:

a first execution unit;

a first status register disposed in the first execution unit, which stores a first status data expressing a state of a first execution unit;

a second execution unit which receives the first status data from the first execution unit:

a second status register disposed in the second execution unit, which stores a second status data relating to a state of the second execution unit; and a priority control unit disposed in the second execution unit, which selects a trap request, on the basis of a priority determined by the first status data and second status data, in a case where a plurality of trap requests are issued simultaneously in said second execution unit.

12. The operation processing apparatus according to claim 11, wherein said priority control unit selects the trap request of a highest priority, among three or more trap requests, on the basis of the priority determined by the first status data and second status data, when three or more trap requests are given in said second execution unit at the same time.

13. An operation processing apparatus comprising:
a first execution unit;
a first status register disposed in the first execution unit, which stores a first status data expressing a state of the first execution unit;
a plurality of second execution units which output a second status data relating to a state of the first execution units;
a second status register disposed in each of the second execution units, which stores a second status data relating to a state of each one of a the second execution units other than said first execution unit; and
a priority control unit disposed in the first execution unit, which selects a trap request, on the basis of a priority determined by the first status data and plurality of second status data, in a case where a plurality of trap requests are issued simultaneously in said second execution units.

14. The operation processing apparatus according to claim 13, wherein said priority control unit selects the trap request of the highest priority, among three or more trap requests, on the basis of the priority determined by the first status data and the plurality of second status data, when three or more trap requests are given in said second execution unit at the same time.

15. A trap controller of a processor for mapping trap requests to trap codes according to a current operating system, where the processor comprises an executing unit comprising at least one of an integer unit, a floating point unit, and a memory management unit, where the processing unit generates different trap requests when different corresponding types of errors occur in the executing unit, where the processor further comprises the trap controller, the trap controller comprising:
a plurality of trap maps, where each trap map corresponds to a different operating system and each trap map provides a mapping between a trap request generated by the executing unit and a trap code specific to trap map's operating system, where a trap code indicates a type of error in the executing unit that caused the trap request to be generated.

16. A processing apparatus, outputting different trap codes to different operating systems executed by the processing apparatus, where
when a first operating system of a first type is being executed by the processing apparatus, a particular type of error of the processing apparatus occurs during the execution of the first operating system, and in response the processing apparatus generates a particular trap request according to which the processing apparatus outputs a first trap code to the first operating system, and where
when a second operating system of a second type is being executed by the processing apparatus, the particular type of error occurs during the execution of the second operating system, and in response the processing apparatus generates the particular trap request according to which the processing apparatus outputs a second trap code to the second operating system, where the first and second trap codes are different.

* * * * *